United States Patent
Kadous

(10) Patent No.: US 10,659,598 B2
(45) Date of Patent: *May 19, 2020

(54) DETECTING DRIVING WITH A WEARABLE COMPUTING DEVICE

(71) Applicant: Google LLC, Mountain View, CA (US)

(72) Inventor: Mohammed Waleed Kadous, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/436,872

(22) Filed: Jun. 10, 2019

(65) Prior Publication Data

US 2019/0297183 A1    Sep. 26, 2019

Related U.S. Application Data

(63) Continuation of application No. 15/921,239, filed on Mar. 14, 2018, now Pat. No. 10,375,229, which is a
(Continued)

(51) Int. Cl.
*H04M 1/725* (2006.01)
*G06F 1/16* (2006.01)
(Continued)

(52) U.S. Cl.
CPC ........ *H04M 1/72577* (2013.01); *G06F 1/163* (2013.01); *G06F 1/1694* (2013.01); *G06F 1/1698* (2013.01); *G06F 3/011* (2013.01); *G06F 3/014* (2013.01); *G06F 3/017* (2013.01); *G06F 3/0304* (2013.01); *G06F 3/0346* (2013.01); *G06F 21/62* (2013.01);
(Continued)

(58) Field of Classification Search
None
See application file for complete search history.

(56) References Cited

U.S. PATENT DOCUMENTS 6,353,778 B1    3/2002 Brown
7,292,152 B2    11/2007 Torkkola et al.
(Continued)

FOREIGN PATENT DOCUMENTS

CN    101374169 A    2/2009
CN    103108075 A    5/2013
(Continued)

OTHER PUBLICATIONS

Intent to Grant dated Jul. 3, 2018, from counterpart European Application No. 15159283.9, 62 pp.
(Continued)

*Primary Examiner* — Ajit Patel
(74) *Attorney, Agent, or Firm* — Shumaker & Sieffert, P.A.

(57) ABSTRACT

A wearable computing device is described that detects an indication of movement associated with the wearable computing device when a user of the wearable computing device detected being located within a moving vehicle. Based at least in part on the indication of movement, a determination is made that the user of the wearable computing device is currently driving the moving vehicle. An operation is performed based on the determination that the user of the wearable computing device is currently driving the moving vehicle.

20 Claims, 5 Drawing Sheets

Related U.S. Application Data continuation of application No. 15/794,626, filed on Oct. 26, 2017, now Pat. No. 9,961,189, which is a continuation of application No. 15/401,782, filed on Jan. 9, 2017, now Pat. No. 9,832,306, which is a continuation of application No. 14/627,122, filed on Feb. 20, 2015, now Pat. No. 9,571,629, which is a continuation of application No. 14/246,966, filed on Apr. 7, 2014, now Pat. No. 9,037,125.

(51) Int. Cl.

| | | |
|---|---|---|
| *H04W 4/02* | (2018.01) | |
| *G06F 3/01* | (2006.01) | |
| *H04M 1/60* | (2006.01) | |
| *G06F 3/03* | (2006.01) | |
| *G06F 3/0346* | (2013.01) | |
| *G06F 21/62* | (2013.01) | |
| *H04W 4/40* | (2018.01) | |

(52) U.S. Cl.
CPC ..... *H04M 1/6091* (2013.01); *H04M 1/72569* (2013.01); *H04M 1/72572* (2013.01); *H04W 4/026* (2013.01); *H04W 4/027* (2013.01); *H04W 4/40* (2018.02); *H04M 1/7253* (2013.01); *H04M 2250/02* (2013.01)

(56) References Cited

U.S. PATENT DOCUMENTS

| | | |
|---|---|---|
| 7,876,205 B2 | 1/2011 | Catten et al. |
| 8,000,689 B2 | 8/2011 | Featherstone et al. |
| 8,213,962 B2 | 7/2012 | Carr |
| 8,401,578 B2 | 3/2013 | Inselberg |
| 8,478,306 B2 | 7/2013 | Zheng |
| 8,577,703 B2 | 11/2013 | McClellan et al. |
| 8,952,869 B1 | 2/2015 | Weaver et al. |
| 9,037,125 B1 | 5/2015 | Kadous |
| 9,037,199 B1 | 5/2015 | Stogaitis et al. |
| 9,042,872 B1 | 5/2015 | Breed et al. |
| 9,571,629 B2 | 2/2017 | Kadous |
| 9,832,306 B2 | 11/2017 | Kadous |
| 9,961,189 B2 | 5/2018 | Kadous |
| 10,375,229 B2 | 8/2019 | Kadous |
| 2001/0006886 A1 | 7/2001 | Suzuki |
| 2001/0040590 A1 | 11/2001 | Abbott et al. |
| 2003/0109246 A1 | 6/2003 | Shimizu et al. |
| 2005/0119002 A1 | 6/2005 | Bauchot et al. |
| 2005/0255874 A1 | 11/2005 | Stewart-Baxter et al. |
| 2006/0148490 A1 | 7/2006 | Bates et al. |
| 2006/0273888 A1 | 12/2006 | Yamamoto |
| 2008/0299954 A1 | 12/2008 | Wright et al. |
| 2009/0002147 A1 | 1/2009 | Bloebaum et al. |
| 2009/0048944 A1 | 2/2009 | Eagle |
| 2009/0111422 A1 | 4/2009 | Bremer et al. |
| 2009/0132197 A1 | 5/2009 | Rubin et al. |
| 2009/0234614 A1 | 9/2009 | Kahn et al. |
| 2010/0148920 A1 | 6/2010 | Philmon et al. |
| 2010/0216509 A1 | 8/2010 | Riemer et al. |
| 2010/0255778 A1 | 10/2010 | Lovell et al. |
| 2011/0059731 A1 | 3/2011 | Schivley |
| 2011/0212737 A1 | 9/2011 | Isidore |
| 2011/0219080 A1 | 9/2011 | McWithey et al. |
| 2011/0275321 A1 | 11/2011 | Zhou et al. |
| 2012/0250517 A1 | 10/2012 | Saarimaki et al. |
| 2012/0265977 A1 | 10/2012 | Ewell, Jr. et al. |
| 2012/0329444 A1 | 12/2012 | Osann, Jr. |
| 2013/0035117 A1 | 2/2013 | Litkouhi et al. |
| 2013/0041521 A1 | 2/2013 | Basir et al. |
| 2013/0150004 A1 | 6/2013 | Rosen |
| 2013/0245986 A1 | 9/2013 | Grokop et al. |
| 2013/0249785 A1 | 9/2013 | Alameh |
| 2013/0281079 A1 | 10/2013 | Vidal et al. |
| 2013/0303143 A1 | 11/2013 | Schrader et al. |
| 2013/0332160 A1 | 12/2013 | Posa |
| 2014/0002357 A1 | 1/2014 | Pombo et al. |
| 2014/0113619 A1* | 4/2014 | Tibbitts .................. G07C 5/008 455/419 |
| 2014/0187219 A1 | 7/2014 | Yang et al. |
| 2014/0192781 A1 | 7/2014 | Teyeb et al. |
| 2014/0195125 A1 | 7/2014 | Siegel et al. |
| 2014/0256303 A1 | 9/2014 | Jones |
| 2014/0342718 A1 | 11/2014 | Chen et al. |
| 2014/0375477 A1 | 12/2014 | Jain et al. |
| 2015/0024786 A1 | 1/2015 | Asrani et al. |
| 2015/0126170 A1 | 5/2015 | Iyer et al. |
| 2015/0181414 A1 | 6/2015 | Bretscher et al. |
| 2015/0185827 A1 | 7/2015 | Sayed |
| 2015/0213555 A1 | 7/2015 | Barfield et al. |
| 2015/0312404 A1 | 10/2015 | Abramson et al. |
| 2016/0021238 A1 | 1/2016 | Abramson et al. |
| 2016/0249191 A1 | 8/2016 | Avrahami et al. |
| 2018/0063319 A1 | 3/2018 | Kadous |

FOREIGN PATENT DOCUMENTS

| | | |
|---|---|---|
| WO | 2012170366 A1 | 12/2012 |
| WO | 2013040493 A1 | 3/2013 |
| WO | 2014035940 A1 | 3/2014 |

OTHER PUBLICATIONS

Article 94(3) EPC Communication from European Application No. 15159283.9, dated Jul. 5, 2016 7 pgs.

Examination Report from counter European application No. 15159283.9, dated Oct. 12, 2017, 5 pgs.

Examination Report from counterpart European Application No. 15159283.9 dated Feb. 14, 2017, 5 pp.

Extended Search Report from European Application No. 15159283.9, dated Sep. 14, 2015 10 pp.

First Office Action, and translation thereof, from counterpart Chinese Application No. 201510162206.9, dated May 24, 2016, 20 pp.

Gordon-Bloomfield, "Tesla Model S+ Pebble SmartWatch=Tesla Awesomeness on Your Wrist", Transport Evolved [online]. Feb. 26, 2014. Retrieved from the Internet: <http://transportevolved.com/2014/02/26/tesla-model-s-pebble-smartwatch-tesla-awesomeness-on-your-wrist/> 2 pgs.

Griffiths, "Now NISSAN jumps on the smartwatch bandwagon: Wearable tech monitors the performance of the car and its driver," Daily Mail [online]. Sep. 9, 2013. Retrieved from the Internet: <http://www.dailymail.co.uk/sciencetech/article-2415943/Now-NISSAN-jumps-smartwatch-bandwagon-Wearable-tech-monitors-performance-car-driver.html> 3 pgs.

Krause et al., "Context-Aware Mobile Computing: Learning Context-Dependent Personal Preferences from a Wearable Sensor Array," IEEE Transactions on Mobile Computing, vol. 5, No. 2, Feb. 28, 2006, 15 pp.

Prosecution History from U.S. Appl. No. 14/246,966 from Sep. 12, 2014 through Jan. 22, 2015 27 pp.

Prosecution History from U.S. Appl. No. 14/627,122 from Jun. 16, 2016 to Dec. 29, 2016 42 pgs.

Prosecution History from U.S. Appl. No. 15/401,782, dated May 18, 2017 through Sep. 14, 2017, 28 pp.

Prosecution History from U.S. Appl. No. 15/794,626, dated Nov. 30, 2017 through Feb. 22, 2018, 46 pp.

Response to Examination Report dated Jul. 5, 2016, from counterpart European Application No. 15159283.9, filed Nov. 7, 2016, 11 pp.

Response to Examination Report dated Oct. 12, 2017, from counterpart European Application No. 15159283.9, filed Jan. 11, 2018, 8 pp.

Response to Examination Report from counterpart European Application No. 15159283.9 dated Feb. 14, 2017, filed Jun. 13, 2017, 13 pp.

(56) References Cited

OTHER PUBLICATIONS

Response to Rule 70(2) and 70a(2) EPC Communication from European Application No. 15159283.9, filed Apr. 13, 2016 16 pgs.
Second Office Action, and translation thereof, from counterpart Chinese Application No. 201510162206.9, dated Jan. 5, 2017, 18 pp.
Third Office Action, and translation thereof, from counterpart Chinese Application No. 201510162206.9, dated Jun. 2, 2017, 18 pp.
Using Mobile Phones to Determine Transportation Modes, Reddy et al., http://www.cs.cornell.edu/-destrin/resources/journals/2010-feb-Reddy-Transportation-Modes. pdf, Feb. 2010, pp. 13.6-13.7.
Notification of Grant from counterpart Chinese Application No. 201510162206.9, dated Apr. 29, 2019, 14 pp.
Extended Search Report from counterpart European Application No. 18200764.1, dated Mar. 14, 2019, 11 pp.
Wood et al., "Context-Aware Wireless Sensor Networks for Assisted Living Residential Monitoring", IEEE Network, Aug. 31, 2008, 8 pp.
Maurer et al., "Location and Activity Recognition Using eWatch: A Wearable Sensor Platform", Lecture Notes in Computer Science, Jan. 2006, 17 pp.
Fifth Office Action, and translation thereof, from counterpart Chinese Application No. 201510162206.9, dated Dec. 17, 2018, 7 pp.
First Examination Report, and translation thereof, from counterpart Indian Application No. 259/KOL/2015, dated Dec. 31, 2018, 6 pp.
Response to First Examination Report dated Dec. 31, 2018, from counterpart Indian Application No. 259/KOL/2015, filed Mar. 15, 2019, 22 pp.
Prosecution History from U.S. Appl. No. 15/921,239 from Mar. 22, 2019 through Jun. 6, 2019 15 pp.
Decision to Grant from counterpart European Application No. 15159283.9 dated Nov. 22, 2018, 2 pp.
Response to extended Search Report dated Mar. 14, 2019 from counterpart European Application No. 18200764.1, filed Sep. 10, 2019, 13 pp.
Fourth Office Action, and translation thereof, from counterpart Chinese Application No. 201510162206.9, dated Nov. 3, 2017, 21 pp.

* cited by examiner

DETECTING DRIVING WITH A WEARABLE COMPUTING DEVICE

This application is a Continuation of application Ser. No. 15/921,239, filed on Mar. 14, 2018, which is a Continuation of application Ser. No. 15/794,626, filed on Oct. 26, 2017, now U.S. Pat. No. 9,961,189, issued May 1, 2018, which is a Continuation of application Ser. No. 15/401,782, filed on Jan. 9, 2017, now U.S. Pat. No. 9,832,306, issued Nov. 28, 2017, which is a Continuation of application Ser. No. 14/627,122, filed on Feb. 20, 2015, now U.S. Pat. No. 9,571,629, issued Feb. 14, 2017, which is a Continuation of application Ser. No. 14/246,966, filed on Apr. 7, 2014, now U.S. Pat. No. 9,037,125, issued May 19, 2015, the entire content of each of which is hereby incorporated by reference.

BACKGROUND

Some mobile devices (e.g., wearable computing devices, mobile phones, tablet computing devices, vehicle entertainment or navigation systems, etc.) provide a variety of functions that a user may wish to access while traveling in a vehicle. User interaction with certain functions of a mobile device may be unsafe and/or unlawful when a user of the mobile device is simultaneously operating a vehicle. To promote safe and/or lawful interaction with the mobile device, some mobile devices enable and/or disable certain functions responsive to the mobile device detecting that the mobile device is located in a moving vehicle. As such, even if a user of the mobile device is merely a passenger in the moving vehicle (and thus is not actually operating or driving the vehicle), the mobile device may unnecessarily prevent the user from safely and lawfully accessing one or more functions of the mobile device.

SUMMARY

In one example, the disclosure is directed to a method that includes detecting that a wearable computing device is located within a moving vehicle, detecting, by the wearable computing device, an indication of movement associated with the wearable computing device, and determining, based at least in part on the indication of movement, that a user of the wearable computing device is currently driving the moving vehicle. The method further includes performing, based on the determination that the user of the wearable computing device is currently driving the moving vehicle, an operation.

In another example, the disclosure is directed to a wearable computing device that includes at least one processor and at least one module operable by the at least one processor to detect that the wearable computing device is located within a moving vehicle, detect an indication of movement associated with the wearable computing device and determine, based at least in part on the indication of movement, that a user of the wearable computing device is currently driving the moving vehicle. The at least one module is further operable by the at least one processor to perform, based on the determination that the user of the wearable computing device is currently driving the moving vehicle, an operation.

In another example, the disclosure is directed to a method that includes receiving, by a computing system, from a wearable computing device, information that includes one or more indications of movement associated with the wearable computing device and at least one indication that the wearable computing device is located within a moving vehicle, and determining, by the computing system, based at least in part on the one or more indications of movement and the at least one indication that the wearable computing device is located within the moving vehicle, a probability that a user of the wearable computing device is performing an act of driving. The method further includes responsive to determining that the probability satisfies a probability threshold, determining, by the computing system, that the user of the wearable computing device is currently driving the moving vehicle, and outputting, by the computing system, for transmission to at least one of the wearable computing device or at least one second computing device, information that configures the at least one of the wearable computing device or the at least one second device to perform an operation.

The details of one or more examples are set forth in the accompanying drawings and the description below. Other features, objects, and advantages of the disclosure will be apparent from the description and drawings, and from the claims.

DETAILED DESCRIPTION

Figure 1:
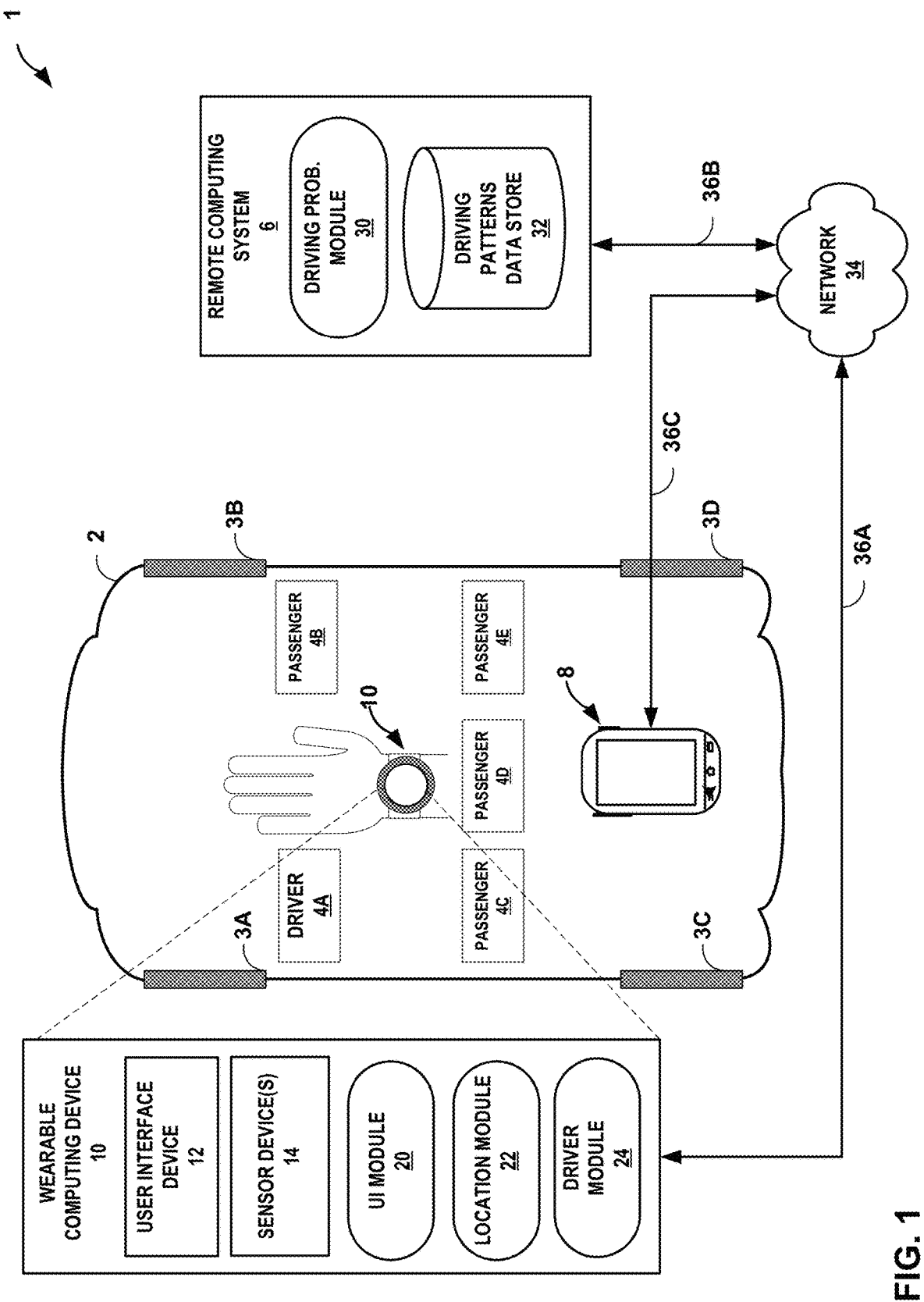
FIG. 1 is a conceptual diagram illustrating an example computing system configured to determine whether a user of a wearable computing device is driving a moving vehicle, in accordance with one or more aspects of the present disclosure.

In general, techniques of this disclosure may enable a wearable computing device (e.g., a computerized watch, computerized eyewear, etc.) to perform an operation based on a determination that a user of the wearable computing device (e.g., a person wearing the wearable computing device) is driving a moving vehicle. When the wearable computing device is located at, on, or within the transportation moving vehicle (e.g., at or near a location of the transportation vehicle, within range of a wireless communication signal of the transportation vehicle, etc.) an inference may be made that the user of the wearable computing device is riding in the transportation vehicle. Based on an indication of movement detected by the wearable computing device, a determination can be made as to whether the person riding in the moving vehicle is driving the moving vehicle (e.g., by performing an act of driving such as turning a steering wheel, moving a gear shift, etc.). The wearable computing device and/or other computing devices (e.g., a server device, a mobile phone, etc.) may accordingly perform one or more operations (e.g., enabling and/or disabling a function, feature, and/or component of the wearable computing device, outputting information from the wearable computing device, etc.) if the determination is made that the person is performing driving the moving vehicle (and not merely riding in the transportation vehicle).

Unlike some mobile computing devices that may enable and/or disable certain features of a device whenever a user is riding in a transportation vehicle, a wearable computing device or other computing devices in accordance with techniques of this disclosure may perform certain operations responsive to first determining whether a user of the wearable computing device is actually driving the transportation vehicle, and not merely a passenger riding in the transportation vehicle. In this manner, the wearable computing device can promote safe and lawful use of the device without unnecessarily enabling or disabling certain features when a person wearing the wearable computing device is riding in the transportation vehicle. In other words, if a user of the wearable computing device is merely a passenger of the moving vehicle, and is not actually operating or driving the vehicle, the wearable computing device may be configured to refrain from unnecessarily inhibiting the wearable computing device from performing certain operations.

Throughout the disclosure, examples are described where a computing system (e.g., a server, etc.) and/or computing device (e.g., a wearable computing device, etc.) may analyze information (e.g., locations, speeds, accelerations, orientations, etc.) associated with the computing system and/or computing device, only if the computing system and/or computing device receives permission from a user (e.g., a person wearing a wearable computing device) to analyze the information. For example, in situations discussed below in which the mobile computing device may collect or may make use of information associated with the user and the computing system and/or computing device, the user may be provided with an opportunity to provide input to control whether programs or features of the computing system and/or computing device can collect and make use of user information (e.g., information about a user's e-mail, a user's social network, social actions or activities, profession, a user's preferences, or a user's past and current location), or to dictate whether and/or how to the computing system and/or computing device may receive content that may be relevant to the user. In addition, certain data may be treated in one or more ways before it is stored or used by the computing system and/or computing device, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing system and/or computing device.

FIG. 1 is a conceptual diagram illustrating computing system 1 which is configured to determine whether a user of a wearable computing device is driving a moving vehicle, in accordance with one or more aspects of the present disclosure. System 1 includes wearable computing device 10, remote computing system 6, mobile computing device 8, and network 34.

FIG. 1 shows wearable computing device 10 and mobile computing device 8 as each being located within or on a transportation vehicle 2 (e.g., an example moving vehicle). In the example of FIG. 1, vehicle 2 represents an overhead view of an automobile having four tires 3A-3D and five seats labeled seats 4A-4E.

The term "transportation vehicle" or "moving vehicle" as used herein refers to any machine or apparatus capable of transporting passengers between geographic locations. Some examples of transportation vehicle 2 include, but are not limited to, an automobile, a railway car, a tram, a trolley, a bus, a taxicab, a shuttle, a monorail, an airplane, a ferry, a motorcycle, a snowmobile, a dirt bike, a boat, a ship, a vessel, a water taxi, and a hovercraft. Transportation vehicles may be commercially owned and operated, privately owned and operated, publicly owned and operated, government owned and operated, military owned and operated, or owned and operated by any other entity.

The term "passenger" as used herein refers to a person or a user who rides in, on, or otherwise travels with a moving, transportation vehicle and does not drive operate or otherwise control the moving, transportation vehicle. The terms "driver" and "operator" as used herein refers to a person or user of a device that not only rides in, on, or otherwise travels with a moving, transportation vehicle, but also drives, operates, otherwise controls the moving, transportation vehicle. A driver is not a passenger.

The phrase "act of driving" as used herein refers to any type of action that a driver or operator of a transportation vehicle may perform when driving, operating, or otherwise controlling the transportation vehicle. For example, an act of driving may include, but is not limited to, turning a steering wheel, moving a gear shift, engaging a brake pedal, pressing an acceleration pedal, moving a throttle lever, etc.

Network 34 represents any public or private communication network. Wearable computing device 10, mobile computing device 8, and remote computing system 6 may send and receive data across network 34 using any suitable communication techniques. For example, wearable computing device 10 may be operatively coupled to network 34 using network link 36A. Remote computing system 6 may be operatively coupled to network 34 by network link 36B and mobile computing device 8 may be operatively coupled to network 34 using network link 36C.

Network 34 may include network hubs, network switches, network routers, etc., that are operatively inter-coupled thereby providing for the exchange of information between wearable computing device 10, mobile computing device 8, and remote computing system 6. In some examples, network links 36A, 36B, and 36C may be Ethernet, ATM or other network connections. Such connections may be wireless and/or wired connections.

Remote computing system 6 of system 1 represents any suitable mobile or stationary remote computing system, such as one or more desktop computers, laptop computers, mainframes, servers, cloud computing systems, etc. capable of sending and receiving information across network link 36B to network 34. In some examples, remote computing system 6 represents a cloud computing system that provides one or more services through network 34. One or more computing devices, such as wearable computing device 10 and mobile computing device 8, may access the one or more services provided by the cloud using remote computing system 6. For example, wearable computing device 10 and/or mobile computing device 8 may store and/or access data in the cloud using remote computing system 6. In some examples, some or all the functionality of remote computing system 6 exists in a mobile computing platform, such as a mobile phone, tablet computer, etc. that can travel with transportation vehicle 2. For instance, some or all the functionality of remote computing system 6 may in some examples reside and execute from within mobile computing device 8.

Remote computing system 6 includes driving probability module 30 and driving patterns data store 32. Driving probability module 30 may perform operations described using software, hardware, firmware, or a mixture of hardware, software, and firmware residing in and/or executing at remote computing system 6. Remote computing system 6 may execute driving probability module 30 with multiple processors or multiple devices. Remote computing system 6 may execute driving probability module 30 as a virtual machine executing on underlying hardware. Driving probability module 30 may execute as a service of an operating system or computing platform. Driving probability module 30 may execute as one or more executable programs at an application layer of a computing platform.

Data store 32 represents any suitable storage medium for storing actual, modeled, predicted, or otherwise derived patterns of location and sensor data that a machine learning system of driving probability module 30 may accesses to infer whether a user of a computing device is performing an act of driving. For example, data store 32 may contain lookup tables, databases, charts, graphs, functions, equations, and the like that driving probability module 30 may access to generate one or more rules. Driving probability module 30 may rely on the rules generated from the information contained at data store 32 to determine whether location and sensor data obtained from wearable computing device 10 and/or mobile computing device 8 indicates that a person is performing an act of driving. Remote computing system 6 may provide access to the data stored at data stored 32 as a cloud based service to devices connected to network 34, such as wearable computing device 10 and mobile computing device 8.

Driving probability module 30 may respond to requests for information (e.g., from wearable computing device 10 and/or mobile computing device 8) indicating whether persons or users of computing devices 10 and 8 are driving or at least performing acts of driving. For instance, driving probability module 30 may receive a request from wearable computing device 10 via network link 36B for a probability indicating whether a person wearing wearable computing device 10 is performing an act of driving and/or whether the person is driving transportation vehicle 2. Driving probability module 30 may receive location and sensor data via link 36B and network 34 from mobile computing device 8 and/or wearable computing device 10 and compare the received location and sensor data to one or more patterns of location and sensor data stored at data store 32 to derive a probability that the person wearing wearable computing device 10 is driving transportation vehicle 2 or at least performing an act of driving. Driving probability module 30 may respond to requests for information from wearable computing device 10 and mobile computing device 8 by sending data via network link 36B and through network 34.

In some examples, wearable computing device 10 may output, for transmission to remote computing system 6, information comprising an indication of movement (e.g., data indicative of a direction, speed, location, orientation, position, elevation, etc. of wearable computing device 10. Responsive to outputting the information comprising the indication of movement, wearable computing device 10 may receive, from remote computing system 6, a probability that a person wearing wearable computing device is 10 performing the act of driving. In other words, whether driving probability module 30 exists at a remote server or a mobile computing platform, wearable computing device 10 may communicate with remote computing system 6 to obtain a probability that a person wearing wearable computing device 10 is driving transportation vehicle 2.

In the example of FIG. 1, mobile computing device 8 is a mobile phone and wearable computing device 10 is a watch. However other examples of mobile computing device 8 and wearable computing device 10 exist.

Wearable computing device 10 may be any type of computing device, which can be worn, held, or otherwise physically attached to a person driving a transportation vehicle, and which includes one or more processors configured to detect movement of the person while the person is driving the transportation vehicle. Examples of wearable computing device 10 include, but are not limited to, a watch, computerized eyewear, a computerized headset, a computerized glove, computerized jewelry, or any other combination of hardware, software, and/or firmware that can be used to detect movement of a person who is wearing, holding, or otherwise attached to wearable computing device 10.

Mobile computing device 8 may be any mobile computing device that includes one or more processors configured to perform operations while physically located in a passenger area or compartment of a transportation vehicle, such as transportation vehicle 2, while the transportation vehicle is in motion. Numerous examples of mobile computing device 8 exist and include, but are not limited to, a mobile phone, a tablet computer, a personal digital assistant (PDA), a laptop computer, a portable gaming device, a portable media player, an e-book reader, a wearable computing device, or any other combination of hardware, software, and/or firmware that can function while contained within a passenger area of a moving transportation vehicle, such as transportation vehicle 2. In some examples, mobile computing device 8 represents an onboard computing platform that is built into a transportation vehicle, such as transportation vehicle 2.

Although shown in FIG. 1 as a separate element apart from remote computing system 6, in some examples, mobile computing device 8 may be a remote computing system including functionality of driving probability module 30 for providing a probability that a person is driving transportation vehicle 2. In other words, although not shown, driving probability module 30 and driving patterns data store 32 may exist locally at mobile computing device 8 and/or may exist locally at wearable computing device 10, to receive information comprising an indication of movement from wearable computing device 10, determine a probability, based on the indication of movement, that the person wearing wearable computing device 10 is performing an act of driving, and output, for transmission to wearable computing device 10, the probability.

In any event, as shown in FIG. 1, wearable computing device 10 includes a user interface device (UID) 12. UID 12 of wearable computing device 10 may function as an input device for wearable computing device 10 and as an output device. UID 12 may be implemented using various technologies. For instance, UID 12 may function as an input device using a microphone and as an output device using a speaker to provide an audio based user interface. UID 12 may function as an input device using a presence-sensitive input display, such as a resistive touchscreen, a surface acoustic wave touchscreen, a capacitive touchscreen, a projective capacitance touchscreen, a pressure sensitive screen, an acoustic pulse recognition touchscreen, or another presence-sensitive display technology. UID 12 may function as an output (e.g., display) device using any one or more display devices, such as a liquid crystal display (LCD), dot matrix display, light emitting diode (LED) display, organic light-emitting diode (OLED) display, e-ink, or similar monochrome or color display capable of outputting visible information to the user of wearable computing device 10.

UID 12 of wearable computing device 10 may include a presence-sensitive display that may receive tactile input from a user of wearable computing device 10. UID 12 may receive indications of the tactile input by detecting one or more gestures from a user of wearable computing device 10 (e.g., the user touching or pointing to one or more locations of UID 12 with a finger or a stylus pen). UID 12 may present output to a user, for instance at a presence-sensitive display. UID 12 may present the output as a graphical user interface which may be associated with functionality provided by wearable computing device 10. For example, UID 12 may present various user interfaces of applications executing at or accessible by wearable computing device 10 (e.g., an electronic message application, a navigation application, an Internet browser application, etc.). A user may interact with a respective user interface of an application to cause wearable computing device 10 to perform operations relating to a function.

FIG. 1 shows that wearable computing device 10 includes one or more sensor devices 14 for capturing location and sensor data associated with wearable computing device 10. Many examples of sensor devices 14 exist including microphones, cameras, accelerometers, gyroscopes, thermometers, galvanic skin response sensors, pressure sensors, barometers, ambient light sensors, heart rate monitors, altimeters, and the like. One or more sensors 14 may capture location and sensor data and output the captured location and sensor data to one or more components of wearable computing device 10, such as modules 20, 22, and 24.

Wearable computing device 10 may include user interface ("UI") module 20, location module 22, and driver module 24. Modules 20, 22, and 24 may perform operations described using software, hardware, firmware, or a mixture of hardware, software, and firmware residing in and/or executing at wearable computing device 10. Wearable computing device 10 may execute modules 20, 22, and 24 with multiple processors. Wearable computing device 10 may execute modules 20, 22, and 24 as a virtual machine executing on underlying hardware. Modules 20, 22, and 24 may execute as one or more services of an operating system, a computing platform. Modules 20, 22, and 24 may execute as one or more remote computing services, such as one or more services provided by a cloud and/or cluster based computing system. Modules 20, 22, and 24 may execute as one or more executable programs at an application layer of a computing platform.

UI module 20 may cause UID 12 to present audio (e.g., sounds), graphics, or other types of output (e.g., haptic feedback, etc.) associated with a user interface that a person may use to interact with features and/or functions of wearable computing device 10. UI module 20 may receive information from driver module 24 that causes UI module 20 to alter or otherwise change, the presentation of a user interface at UID 12. For instance, when wearable computing device 10 determines that a person wearing computing device 10 is currently driving a transportation vehicle, driver module 24 may output information to UI module 20 that causes UI module 20 to disable UID 12 to prevent the person from being distracted by the audio, graphics, or other types of output that UI module 20 may otherwise cause UID 12 to output. UI module 20 may receive information from driver module 24 that indicates that the person wearing wearable computing device 10 is not driving a transportation vehicle and may enable UID 12 to allow the person to interact with the audio, graphics or other types of output that UI module 20 causes UID 12 to present.

Location module 22 may determine whether wearable computing device 10 is within the presence of transportation vehicle 2. Modules 20 and 24 may receive information (e.g., data) from location module 22 when location module 22 detects a presence of transportation vehicle 2. When wearable computing device 10 is in the presence of transportation vehicle 2, wearable computing device 10 may be located in, on, or otherwise contained within a passenger area of transportation vehicle 2. For example, location module 22 may determine whether a location of wearable computing device 10 is within a threshold distance of transportation vehicle 2 based on signal data received by wearable computing device 10 and/or location and sensor data received from sensor devices 14.

For instance, a communication unit (e.g., near-field-communication radio, Wi-Fi radio, CB radio, cellular radio, Bluetooth radio, etc.) of wearable computing device 10 may receive communication signals from and/or transmit communication signals to a communication unit (e.g., near-field-communication radio, Wi-Fi radio, CB radio, Bluetooth radio, etc.) of transportation vehicle 2. Location module 22 may infer that when the communication unit of wearable computing device 10 is in range of the communication unit of transportation vehicle 2 that, wearable computing device 10 and transportation vehicle 2 are collocated (e.g., within a threshold distance of each other) or otherwise within the presence of each other. Location module 22 may infer that when the communication unit of wearable computing device 10 is not in range of the communication unit of transportation vehicle 2, that wearable computing device 10 and transportation unit 2 are not collocated or otherwise within the presence of each other.

Location module 22 may rely on location and sensor data obtained by sensor devices 14 to determine whether wearable computing device 10 is within a threshold distance of transportation vehicle 2 or otherwise within a presence of transportation vehicle 2. For example, location module 22 may determine a speed associated with wearable computing device 10 based on location and sensor data obtained by sensor devices 14. If the speed associated with wearable computing device 10 is approximately or equal to a threshold speed at which transportation vehicle 2 generally travels at (e.g., an average speed of a moving automobile) location module 22 may determine that wearable computing device 10 is on, in, or otherwise within a presence of transportation vehicle 2.

In some examples, wearable computing device 10 may include a global positioning system (GPS) radio for receiving GPS signals (e.g., from a GPS satellite) having location and sensor data corresponding to the current location of wearable computing device 10. Location module 22 may include, or otherwise access (e.g., by communicating over network 34 with remote computing system 6) maps and transportation information associated with transportation vehicle 2. Location module 22 may look up the determined location of wearable computing device 10 from the maps and transportation information to determine whether wearable computing device is within a presence or threshold distance of a travel route (e.g., a road, a track, etc.) associated with transportation vehicle 2.

Driver module 24 may determine, infer, or otherwise obtain information indicating that the person wearing wearable computing device 10 is driving transportation vehicle 2. Driver module 24 may analyze location and sensor data obtained by sensor devices 14 to identify indications of movement that may or may not indicate when a person wearing wearable computing device 10 is driving transportation vehicle 2. Driver module 24 may communicate with remote computing system 6 via network 34 to obtain a probability or other information indicating whether location and sensor data obtained by sensor devices 14 of wearable computing device 10 indicates that a person wearing wearable computing device 10 is driving transportation vehicle 2.

Responsive to determining that the person wearing wearable computing device 10 is driving transportation vehicle 2, driver module 24 may cause wearable computing device 10 to perform an operation. For example responsive to determining that the person wearing wearable computing device 10 is driving transportation vehicle 2, driver module 24 may output information to UI module 20 that causes UI module 20 to disable or otherwise turn-off UID 12.

In some examples, driver module 24 may include features and or capabilities of driving probability module 30 and/or driving patterns data store 32. In other words, driver module 24 may store information that a machine learning system of driver module 24 may accesses to infer whether a user of wearable computing device 10 is performing an act of driving. Driver module 24 may rely on rules generated by the machine learning system to determine whether location and sensor data obtained from sensors 14 and/or mobile computing device 8 indicates that a person is performing an act of driving.

In some examples, driver module 24 may factor a probability indicating whether a person wearing wearable computing device 10 is driving transportation vehicle 2 with other sources or types of information (e.g., co-presence with others in the vehicle, schedule information indicating that the user may typically drive to work at a current time, etc.) to determine that the person wearing wearable computing device 10 is driving transportation vehicle 2. Said differently, there are other computation models or information that can be relied on by wearable computing device 10 to determine that a person is driving before performing an operation in response to determining that the person wearing wearable computing device 10 is driving.

In accordance with techniques of this disclosure, computing device 10 may detect a presence of transportation vehicle 2. In other words, computing device 10 may detect that a user of computing device 10 is located within a moving vehicle. Before or after detecting the presence of transportation vehicle 2, wearable computing device 10 may detect an indication of movement associated with wearable computing device 10.

For example, location module 22 may obtain signal data received by wearable computing device 10 that includes a Bluetooth communication radio identifier associated with transportation vehicle 2. Location module 22 may determine that a maximum range associated with Bluetooth signal data is less than a threshold distance for indicating whether wearable computing device 10 is collocated with transportation vehicle 2. Location module 22 may determine that by receiving the Bluetooth communication radio data that the location of wearable computing device 10 is within the threshold distance of transportation vehicle 2 or otherwise indicate the detection of a presence of transportation vehicle 2.

In some examples, location module 22 may interpret information contained in signal data received from transportation vehicle 2 to determine that the signal data did in fact originate at transportation vehicle 2. Some examples of wearable computing device 10 detecting a presence of transportation vehicle 2 may be examples when location module 22 detects signal data originating from transportation vehicle 2. In some examples, mobile computing device 8 may detect the presence of transportation vehicle 2 and send information to wearable computing device 10 and/or remote computing system 6 indicating the presence of transportation vehicle 2.

In some examples, location module 22 may determine that an acceleration, speed, or direction associated with computing device 10 indicates that a user of computing device 10 is within a moving vehicle. For instance, if the speed of computing device 10 exceeds a speed threshold (e.g., 55 miles per hour), the location module 22 may infer that the user of computing device 10 is in a moving vehicle traveling at highway speeds.

Location module 22 may provide an alert to driver module 24 that indicates the location of wearable computing device 10 is collocated with transportation vehicle 2. After receiving the alert, driver module 24 may detect an indication of movement associated with wearable computing device 10. For instance, driver module 24 may receive accelerometer data, gyroscope data, speedometer data, etc. from sensors 14. Driver module 24 may detect a change in the location and sensor data from sensors 14 indicating that wearable computing device 10 has moved.

In response to the indication of movement, driver module 24 may determine whether a person wearing wearable computing device 10 is driving transportation vehicle 2. For example, driver module 24 may determine whether the person is driving transportation vehicle in order to determine whether to output information to UI module 20 to cause UI module 20 to alter the presentation of a user interface at UID 12 or to otherwise cause wearable computing device 10 to perform an operation if driver module 24.

In some examples, location module 22 may rely on image data captured by a camera of wearable computing device 10 and/or mobile computing device 8 to infer whether the person wearing wearable computing device is within the presence or otherwise located within transportation vehicle 2. For instance, wearable computing device 10 may include a camera as one example of sensor devices 14. Location module 22 may receive image data captured by the camera and compare the captured image data to one or more stored images of vehicle parts (e.g., pedals, steering wheel, gauges, dials, buttons, seats, views from within, etc.) or logos (e.g., car manufacturer logos, etc.). If location module 22 receives image data that corresponds to one or more of these known or stored images associated with transportation vehicle 2 then location module 22 may alert driver module 24 that the person wearing wearable computing device 10 is located within or in the presence of transportation vehicle 2.

In some examples, to determine whether the person is driving, driver module 24 may output the location and sensor data gathered by sensors 14 and/or other information specifying the indication of movement detected by driver module 24 to driving probability module 30 of remote computing system 6. Based at least in part on the indication of movement received from driver module 24, driving probability module 30 may determine a probability that a person wearing wearable computing device 8 is performing an act of driving. For example, driving probability module 30 may compare the gyroscopic data, acceleration data, speed data, barometric pressure data, etc. to one or more patterns of location and sensor data stored at driving patterns data store 32.

A machine learning system of driving probability module 30 may receive the location and sensor data from wearable computing device 10 as input, and by using rules for predicting acts of driving based on location and sensor data, the machine learning system may output a probability that the person wearing the computing device from which the location and sensor data was received, is performing an act of driving. For example, the machine learning system of driving probability module 30 may analyze barometric pressure data received from wearable computing device 10 to determine relative changes in elevation of wearable computing device 10. The variation in barometric pressure can be used by the machine learning system to determine small changes in elevation that may indicate whether a person wearing wearable computing device 10 is moving his or hand up and down in a way that is consistent with a pattern of movement associated with driving a vehicle. For example, a person who wears wearable computing device 10 may cause the elevation of wearable computing device 10 to change as the person steers a steering wheel, moves a gear shift, etc.

The techniques described herein are not limited to a machine learning system. For example, driving probability module 30 may rely on a machine learning system as described above, and/or manually engineered heuristics programmed into driving probability module 30 to make a determination as to the probability that a person is performing an act of driving or otherwise driving or operating a moving vehicle.

In any event, the machine learning system of driving probability module 30 may produce one or more probabilities indicating whether a person associated with the location and sensor data is performing an act of driving. Driving probability module 30 may compare the one or more probabilities to one or more respective probability thresholds for determining whether the person associated with the location and sensor data is driving a transportation vehicle. In some examples, driving probability module 30 may output the one or more probabilities to driver module 24 and driver module 24 may use the probabilities to determine whether a person wearing wearable computing device 10 is driving transportation vehicle 2.

Responsive to determining that the probability satisfies a probability threshold, wearable computing device 10 may determine that the person wearing wearable computing device 10 is currently driving the transportation vehicle. For example, driver module 24 may receive one or more probabilities from remote computing system 6 and compare each of the one or more probabilities to respective probability thresholds to determine whether the values of the probabilities exceed the values (e.g., 50%, etc.) of the probability thresholds. In some examples, if a sufficient quantity of probabilities are satisfied, driver module 24 and/or driving probability module 30 may determine that the person wearing wearable computing device 10 is performing driving transportation vehicle 2.

If driver module 24 determines or otherwise receives information indicating that the person wearing wearable computing device 10 is driving, wearable computing device 10 may perform, based on the determination that the person wearing wearable computing device 10 is the driver, an operation. For example driver module 24 may output information to UI module 20 indicating that the person wearing wearable computing device 10 is currently driving the transportation vehicle 2.

In response to receiving information that the person is that the person driving transportation vehicle 2, UI module 20 may cause UID 12 to refrain from outputting information for display, may enable or disable features provided by wearable computing device 10, or may cause wearable computing device 10 to perform some other operation. For example, UI module 20 may enable an audio feedback and voice recognition system in response to receiving information that the person is that the person driving transportation vehicle 2 to prevent the person from viewing or otherwise navigating through information displayed at UID 12. UI module 20 may disable UID 12 or prevent access to certain features of wearable computing device 10 that may be dangerous or otherwise be a distraction to the person while driving transportation vehicle 2.

In some examples, wearable computing device 10 may output data indicating that the person is driving to remote computing system 6 for use in generating additional rules that driving probability module 30 or other wearable computing devices may use to determine whether a person is driving. In some examples, wearable computing device 10 may output information over network 34 to mobile computing device 8 that causes mobile computing device 8 to enable or disable one or more features provided to the person wearing wearable computing device 10 while driving. For example, mobile computing device 8 may disable text based messaging functions in response to receiving information from wearable computing device 10 that the person is driving. In other examples, mobile computing device 8 may enable speech-to-text based messaging functions in response to receiving such information.

In this way, techniques of this disclosure may enable a wearable computing device to automatically perform one or more operations based on a determination that a person wearing the wearable computing device is also driving a transportation vehicle. By automatically performing operations based on an inference that the person is driving the transportation vehicle, and not just based on a determination that the person is a passenger, the person wearing the wearable computing device may perceive the wearable computing device as being more accurate and/or more useful than some other computing devices that may generally perform operations in all instances whenever the person is a driving and a non-driving passenger in a transportation vehicle.

Although the example system 1 of FIG. 1 includes a mobile phone and a remote computing device, it should be understood that the techinques of this disclosure may be performed entirely by a wearable computing device such as wearable computing device 10. In some examples, the techniques may be mostly performed by a mobile computing device, such as mobile computing device 8, that merely relies on sensor data obtained by wearable computing device 10 to make a determination about whether a person who is wearing a wearable computing device is driving a transportation vehicle. In some examples, the techniques may be mostly performed by a mobile computing device such as mobile computing device 8 and/or mostly performed by a remote computing system such as remote computing system 6 that merely relies on sensor data obtained by wearable computing device 10 to make a determination about whether a person who is wearing a wearable computing device is driving a transportation vehicle.

Throughout the disclosure, examples are described where a computing system (e.g., a server, etc.) and/or computing device (e.g., a wearable computing device, etc.) may analyze information (e.g., locations, speeds, accelerations, orientations, etc.) associated with the computing system and/or computing device, only if the computing system and/or computing device receives permission from a user (e.g., a person wearing a wearable computing device) to analyze the information. For example, in situations discussed below in which the mobile computing device may collect or may make use of information associated with the user and the computing system and/or computing device, the user may be provided with an opportunity to provide input to control whether programs or features of the computing system and/or computing device can collect and make use of user information (e.g., information about a user's e-mail, a user's social network, social actions or activities, profession, a user's preferences, or a user's past and current location), or to dictate whether and/or how to the computing system and/or computing device may receive content that may be relevant to the user. In addition, certain data may be treated in one or more ways before it is stored or used by the computing system and/or computing device, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing system and/or computing device.

Figure 2:
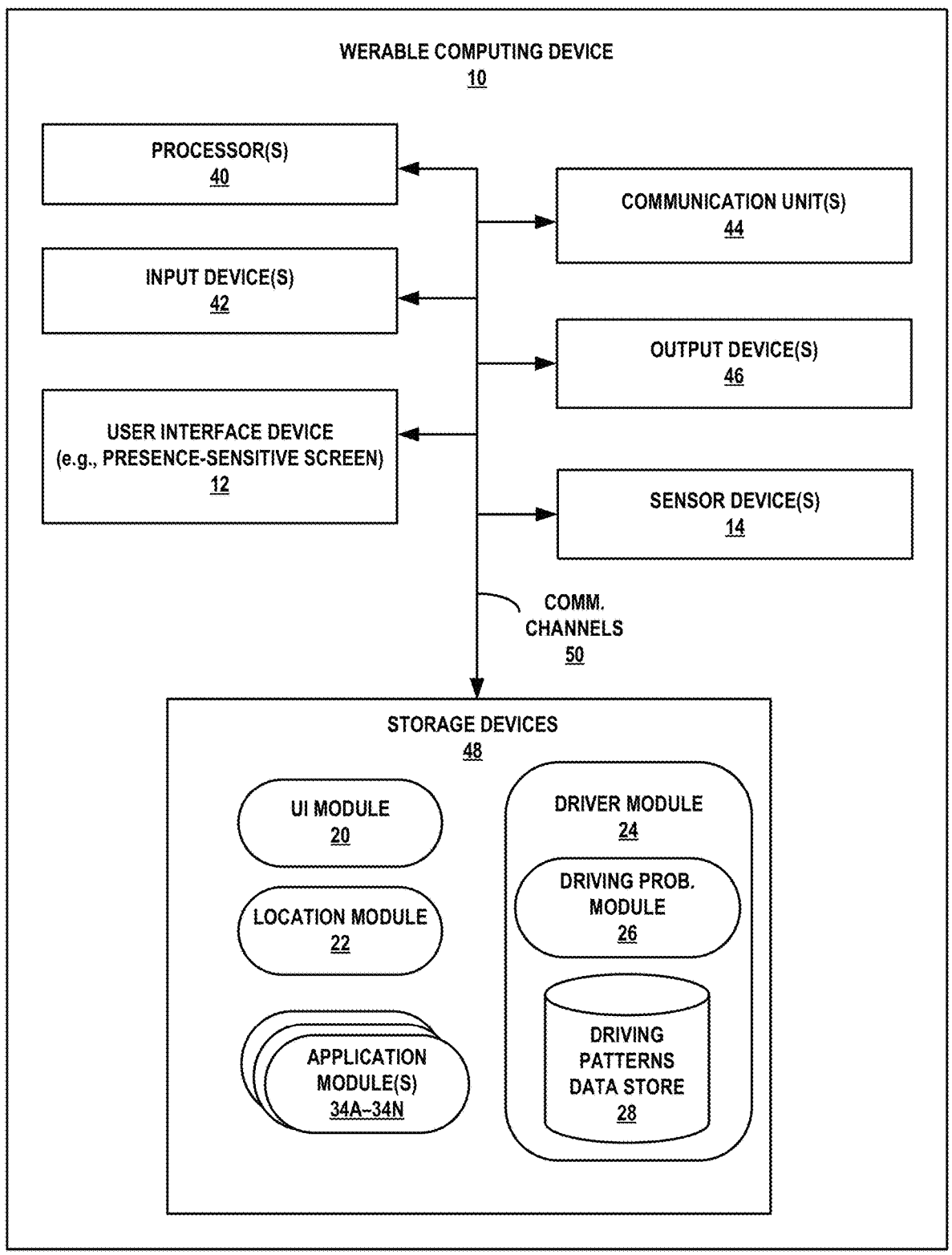
FIG. 2 is a block diagram illustrating an example wearable device configured to determine whether a user of the wearable computing device is driving a moving vehicle, in accordance with one or more aspects of the present disclosure.

FIG. 2 is a block diagram illustrating an example wearable device configured to determine whether a person wearing the wearable computing device is driving a transportation vehicle, in accordance with one or more aspects of the present disclosure. Wearable computing device 10 of FIG. 2 is described below within the context of system 1 of FIG. 1. FIG. 2 illustrates only one particular example of wearable computing device 10 of system 1, and many other examples of wearable computing device 10 may be used in other instances and may include a subset of the components included in example wearable computing device 10 or may include additional components not shown in FIG. 2.

As shown in the example of FIG. 2, wearable computing device 10 includes user interface device 12 ("UID 12"), one or more sensor devices 14, one or more processors 40, one or more input devices 42, one or more communication units 44, one or more output devices 46, and one or more storage devices 48. Storage devices 48 of wearable computing device 10 also include UI module 20, location module 22, and driver module 24, and application modules 34A-34N (collectively referred to as, "application modules 34"). Driver module 24 includes driving probability module 26 and driving patterns data store 28. Communication channels 50 may interconnect each of the components 12, 14, 20, 22, 24, 26, 28, 34, 40, 42, 44, and 46 for inter-component communications (physically, communicatively, and/or operatively). In some examples, communication channels 50 may include a system bus, a network connection, an inter-process communication data structure, or any other method for communicating data.

One or more input devices 42 of wearable computing device 10 may receive input. Examples of input are tactile, audio, and video input. Input devices 42 of wearable computing device 10, in one example, includes a presence-sensitive display, touch-sensitive screen, mouse, keyboard, voice responsive system, video camera, microphone or any other type of device for detecting input from a human or machine.

One or more output devices 46 of wearable computing device 10 may generate output. Examples of output are tactile, audio, and video output. Output devices 46 of wearable computing device 10, in one example, includes a presence-sensitive display, sound card, video graphics adapter card, speaker, cathode ray tube (CRT) monitor, liquid crystal display (LCD), or any other type of device for generating output to a human or machine.

One or more communication units 44 of wearable computing device 10 may communicate with external devices (e.g., computing device 8, transportation vehicle 2, remote computing system 6, and the like) via one or more networks by transmitting and/or receiving network signals on the one or more networks. For example, wearable computing device 10 may use communication unit 44 to send and receive data to and from remote computing system 6 of FIG. 1. Wearable computing device 10 may use communication unit 44 to transmit and/or receive radio signals on a radio network such as a cellular radio network. Likewise, communication units 44 may transmit and/or receive satellite signals on a satellite network such as a global positioning system (GPS) network. Examples of communication unit 44 include a network interface card (e.g. such as an Ethernet card), an optical transceiver, a radio frequency transceiver, a GPS receiver, or any other type of device that can send and/or receive information. Other examples of communication units 44 may include short wave radios, cellular data radios, wireless Ethernet network radios, as well as universal serial bus (USB) controllers.

In some examples, UID 12 of wearable computing device 10 may include functionality of input devices 42 and/or output devices 46. In the example of FIG. 2, UID 12 may be or may include a presence-sensitive input device. In some examples, a presence sensitive input device may detect an object at and/or near a screen. In one example, a presence-sensitive input device of UID 12 may detect an object, such as a finger or stylus that is within 2 inches or less of the screen. The presence-sensitive input device may determine a location (e.g., an (x,y) coordinate) of a screen at which the object was detected. In another example range, a presence-sensitive input device may detect an object six inches or less from the screen and other ranges are also possible. The presence-sensitive input device may determine the location of the screen selected by a user's finger using capacitive, inductive, and/or optical recognition techniques. In some examples, presence sensitive input device also provides output to a user using tactile, audio, or video stimuli as described with respect to output device 46, e.g., at a display. UI module 20 may cause UID 12 to present a graphical user interface. Said differently, UI module 20 may cause UID 12 to output a graphical user interface for display at a screen of a display device.

While illustrated as an internal component of wearable computing device 10, UID 12 also represents and external component that shares a data path with wearable computing device 10 for transmitting and/or receiving input and output. For instance, in one example, UID 12 represents a built-in component of wearable computing device 10 located within and physically connected to the external packaging of wearable computing device 10 (e.g., a screen on a mobile phone). In another example, UID 12 represents an external component of wearable computing device 10 located outside and physically separated from the packaging of wearable computing device 10 (e.g., a monitor, a projector, etc. that shares a wired and/or wireless data path with a tablet computer).

One or more storage devices 48 within wearable computing device 10 may store information for processing during operation of wearable computing device 10 (e.g., wearable computing device 10 may store data, for instance as driving patterns data store 28, accessed by modules 20, 22, 24, 26, and 34 during execution at wearable computing device 10). In some examples, storage device 48 is a temporary memory, meaning that a primary purpose of storage device 48 is not long-term storage. Storage devices 48 on wearable computing device 10 may configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 48, in some examples, also include one or more computer-readable storage media. Storage devices 48 may be configured to store larger amounts of information than volatile memory. Storage devices 48 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 48 may store program instructions and/or data associated with modules 20, 22, 24, and 26 and data stores 28.

One or more processors 40 may implement functionality and/or execute instructions within wearable computing device 10. For example, processors 40 on wearable computing device 10 may receive and execute instructions stored by storage devices 48 that execute the functionality of UI module 20, location module 22, driver module 24, driving probability module 26, and application modules 34. These instructions executed by processors 40 may cause wearable computing device 10 to store information, within storage devices 48 during program execution. Processors 40 may execute instructions of modules 20, 22, 24, 26, and 34 to cause wearable computing device 10 to execute an operation when a person wearing computing device 10 is driving a transportation vehicle. For instance, processors 40 may execute instructions of module 20, 22, 24, 26, and 34 to activate a voice-to-text feature of wearable computing device 10 and/or suppress touch-based input at computing device 8 when a person wearing wearable computing device 10 is driving.

Application modules 34 may include any type of application that computing device 2 may execute in response to determining that a person wearing wearable computing device 10 is driving a transportation vehicle. For example, application modules 14 may include a speech-to-text application, a hands-free application, a navigation application, a turn-by-turn driving directions application, a text-to-audio application, an emergency assistance application, a telephone application, or any other type of application that may be used by a person wearing a wearable computing device while driving a transportation vehicle. Application modules 34 may be stand-alone applications or processes. In some examples, application modules 34 represent only a portion or some functionality of one or more other applications or systems. In some examples, applications modules 34 represent an operating system or computing platform of wearable computing device 34 for executing or controlling features and operations performed by other applications.

In accordance with techniques of this disclosure, location module 22 of wearable computing device 10 may detect a presence of transportation vehicle 2. For example, communication units 44 may receive Bluetooth signal data, location data, and/or other signal data being transmitted from transportation vehicle 2. Location module 22 may determine (e.g., based on values attributed to the signal data, an identifier associated with the signal data, etc.) that transportation vehicle 2 generates the signal data. Location module 22 may determine that the range of the signal data satisfies (e.g., is less than or equal to) a threshold distance (e.g., several feet, several, meters, etc.). For example, one example range of signal data may be between zero and one hundred meters or approximately three hundred thirty feet for a Bluetooth signal. Bluetooth low energy signals may have a range from between zero to fifty meters or one hundred sixty feet. In response to receiving a Bluetooth signal, location module 22 may infer that the origin of the signal data is less than the range (e.g., less than one hundred meters in one example, less than fifty meters in another example, etc.). Other types of signal data include near field communication (NFC). The range of NFC signals may be on the order of twenty centimeters or less. Location module 22 may rely on a distance threshold set to a maximum range of a particular type of signal data (e.g., low energy Bluetooth). If wearable computing device 10 detects a signal having a maximum range (e.g., 50 meters) that is less than the distance threshold used by location module 22, location module 22 may infer that wearable computing device 10 is in range or in the presence of the origin of the signal data (e.g., transportation vehicle 2).

In some examples, location module 22 may rely on movement data detected by a separate mobile computing device (e.g., mobile computing device 8) to determine that wearable computing device 10 is in, on, within or otherwise in the presence of a transportation vehicle such as transportation vehicle 2. In some examples, wearable computing device 10 may detect a vibration (e.g., from a bumpy road, an engine, etc.) and determine that wearable computing device 10 is within the presence of a transportation vehicle. For instance, location module 22 may receive accelerometer data or other vibration data from one of sensors 14 and compare the vibration data to a pattern of sensor data associated with a moving vehicle. Location module 22 may determine that when the vibration data shares a strong correlation (e.g., greater than 0.5) to a pattern, that wearable computing device 10 may be located within a moving vehicle.

In some examples, location module 22 may receive information from a mobile computing device, such as mobile computing device 8, that includes data indicating that the mobile computing device has inferred that wearable computing device 10 is in the presence of transportation vehicle 2. Said differently, the techniques described above with respect to location module 22 may be performed onboard a mobile computing platform that is separate from wearable computing device 10 (e.g., a mobile phone, a vehicle computer, etc.) and location module 22 may rely on the determination performed by the separate mobile computing device to determine that wearable computing device 10 is in the presence of transportation vehicle 2.

Location module 22 may determine that the receipt of such data, having a range being less than the threshold distance, indicates that wearable computing device 10 is in the presence of transportation vehicle 2. Location module 22 may output an indication (e.g., data) to driver module 24 indicating to driver module 24 that wearable computing device 10 is in the presence of transportation vehicle 2.

After location module 22 of wearable computing device 10 detects the presence of transportation vehicle 2, driver module 24 of wearable computing device 10 may detect an indication of movement associated with wearable computing device 10. For instance, sensor devices 14 (e.g., an accelerometer, a gyroscope, a barometer, etc.) may capture sensor data that indicates a position, speed, a location, a direction, or other degree of movement associated with wearable computing device 10. Driver module 24 may receive one or more indications of movement (e.g., sensor data) from sensors 14 via communication channels 50.

Said differently, driver module 24 may receive sensor information from sensors 14 and determine, based at least in part on one or more sensors 14 of wearable computing device 10, at least a portion of the sensor information that indicates at least one of an acceleration of wearable computing device 10, an orientation of wearable computing device 10, and a barometric pressure of wearable computing device 10. Based on the sensor information, driver module 24 may define the indication of movement for use in determining whether a person wearing computing device 10 is driving. In other words, driver module 24 may convert the raw sensor data (e.g., gyroscopic data, accelerations, positions, etc.) into one or more indications of movement (e.g., data indicating a direction of movement, a speed of movement, an acceleration of movement, etc.) for later use in determining whether a person wearing wearable computing device 10 is driving.

In some examples, driver module 24 may detect an indication of movement associated with transportation vehicle 2 and subtract the indication of movement associated with transportation vehicle 2 from the indication of movement associated with wearable computing device 10. In other words, to obtain a more precise indication of movement associated with wearable computing device 10 and/or to eliminate any noise or movement associated with transportation vehicle 2, driver module 24 may filter any movement attributable to transportation vehicle 2 from the indication of movement of wearable computing device 10 to determine the probability that the person wearing wearable computing device 10 is driving. Said differently, driver module 24 may isolate the movement that is more likely attributed to a person moving wearable computing device 10 from any movement that is more likely attributed to the movement of transportation vehicle 2.

Driver module 24 of wearable computing device 10 may invoke driving probability module 26 to determine, based at least in part on the indication of movement, a probability that a person wearing wearable computing device 10 is performing an act of driving. Driver module 24 may invoke driving probability module 30 of remote computing system 6 to determine the probability. In other words, wearable computing device 10 may in some examples determine a probability that the person wearing wearable computing device 10 is performing an act of driving, locally, or may rely on a determination of the probability by a remote server.

Driver module 24 may determine a probability that the person wearing wearable computing device 10 is performing a variety of acts of driving. For example, driver module 24 may determine a probability of the following acts of driving: turning a steering wheel, shifting a gear shift, changing lanes, staying in a lane, changing acceleration while shifting the gear shift, raising and lowering a hand of the person wearing wearable computing device 10, etc.

Driving probability module 26 may include similar logic and functionality as driving probability module 30 of remote computing system 6 of system 1 in FIG. 1 to determine the probability. For instance, driving probability module 26 may use the indications of movement (e.g., movement data) determined from the sensor data captured by sensor devices 14 and compare the movement data to one or more stored driving patterns at driving patterns data store 28.

Driving probability module 26 may compare gyroscopic data, acceleration data, speed data, barometric pressure data, etc. captured by sensor devices 14 to one or more patterns of location and sensor data stored at driving patterns data store 28. In some examples, rather than rely on actual sensor data, driving probability module 26 may compare defined indications of movement indicating orientations, positions, speeds, directions, elevations, etc. defined by sensor data to one or more patterns of indications of movement stored at driving patterns data store 28.

In any event, a machine learning system of driving probability module 26 may receive the sensor data and from wearable computing device 10 as input, and by using rules for predicting acts of driving based on location and sensor data, the machine learning system may output a probability that the person wearing the computing device from which the location and sensor data was received, is performing an act of driving.

For example, the machine learning system of driving probability module 26 may analyze gyroscopic and/or accelerometer data received from wearable computing device 10 to determine relative changes in speed and/or direction of wearable computing device 10. The variation in speed and/or direction can be used by the machine learning system to determine small changes in speed and/or direction that may indicate whether a person wearing wearable computing device 10 is moving his or hand or other appendage in a way that is consistent with a pattern of movement associated with driving a vehicle. For example, a person who wears wearable computing device 10 may cause the direction and/or speed of wearable computing device 10 to change as the person moves a gear shift, steers a steering wheel, etc.

The machine learning system of driving probability module 26 may produce one or more probabilities indicating whether a person associated with the location and sensor data is performing an act of driving. Driving probability module 26 may compare the one or more probabilities to one or more respective probability thresholds for determining whether the person associated with the location and sensor data is driving transportation vehicle 2. In some examples, driving probability module 26 may output the one or more probabilities to driver module 24 and driver module 24 may use the probabilities to determine whether a person wearing wearable computing device 10 is driving transportation vehicle 2.

Responsive to determining that the probability of the person who wears wearable computing device 10 satisfies a probability threshold, driver module 24 may determine that the person wearing the wearable computing device is currently driving transportation vehicle 2. In other words, driver module 24 may compare the probability that the person is performing an act of driving to determine whether the probability is high enough and therefore indicates that the person is likely driving transportation vehicle 2.

In some examples, driver module 24 may determine that the person is driving if and when a single probability that a person is performing any one act of driving satisfies a threshold. In some examples, driver module 24 may compute a weighted average of probabilities of multiple acts of driving to determine whether the overall weighted probability satisfies the threshold for indicating that the person is driving. For example, driver module 24 may determine a weighted average of the probability that the person is turning a steering wheel, shifting a gear shift, and operating a pedal of a transportation vehicle. Driver module 24 may determine that the person is driving if the weighted average probability of the multiple acts of driving satisfies the threshold. In any event, driver module 24 may output information to other modules of wearable computing device 10, such as UI module 20 and/or application modules 34, to cause wearable computing device 10 to perform an operation.

Wearable computing device 10 may perform, based on the determination that the person wearing wearable computing device 10 is currently driving transportation vehicle 2, an operation. For example, one or more applications 34 (e.g., as part of an application, process, platform, operating system, etc.) executing at wearable computing device 10 may limit access to certain features of the applications 34 in response to receiving information from driver module 24 that the person wearing wearable computing device 10 is currently driving. In some examples, one or more other applications or operating systems executing remotely to wearable computing device 10 (e.g., at mobile computing device 8) may receive the indication from driver module 24 that the person is driving and in response to receiving the information from driver module 24, these one or more other applications or operating systems may limit access to certain features.

Said differently, wearable computing device 10 may restrict access to at least some functionality of an application or operating system (e.g., applications 34) being executed by at least one of the wearable computing device or a second computing device. For example, mobile computing device 8 may prevent a person from accessing a virtual keyboard or a messaging application associated with mobile computing device 8 when the person is driving, wearable computing device 10 may prevent UID 12 from receiving input when the person is driving, etc.

In some examples, in performing the operation in response to determining that the person is driving, wearable computing device 10 may output, for transmission to at least one second computing device, information usable by the at least one second computing device to learn driving habits of the person that is wearing the wearable computing device and/or to learn a driving route associated with the person. Said differently, through communication units 44, driver module 24 may output indications (e.g., data) to remote computing system 6 containing information specifying when, where, and how driver module 24 determines that the person is driving, information specifying sensor data captured by sensor devices 14 used to discern that the person is driving, information for providing driving patterns or driving habits of the person that is driving, and other types of information about the time and/or location of the person and wearable computing device 10 when wearable computing device 10 determined that the person is driving. Remote computing system 6 may use the information received from wearable computing device 10 when the person is driving to generate one or more rules of a machine learning system for predicting when the person and/or other persons of other wearable computing devices are driving, where the person and/or other persons may drive and the route or routes the person and/or other persons may take.

In some examples, in performing the operation in response to determining that the person is driving, wearable computing device 10 may deactivate a display device that is operatively coupled to at least one of wearable computing device 10 and a second computing device. For instance, UI module 20 may receive information from driver module 24 indicating that the person is driving and in response, deactivate UID 12 and cause UID 12 to cease outputting information for display. Mobile computing device 8 (e.g., the person's mobile phone) may receive information from driver module 24 indicating that the person is driving and in response, deactivate a screen, a display device, or other input/output device of mobile computing device 8.

Some computing systems and/or devices may perform operations or offer features depending on whether a user of such a system is actually driving or whether the person is simply riding in a transportation vehicle. For example, a system or device that provides a contextual user interface (e.g., an interface that may change depending on the time of day, user's emotion, user's location, etc.) may rely on information that indicates whether the user of the system is driving. One objective of such a system or device may be to promote safety and "save lives" by "locking out" a messaging service (e.g., SMS) provided by the system or device while the user is driving. Such a system or device may be unable to determine whether the person is driving based on accelerometer data detected by a mobile phone since both a driver and a passenger will see similar acceleration values regardless whether either is actually driving. Hence, some systems or devices may require the ability to detect wither a person is driving to offer such functionality with accuracy and without annoying non-driving passengers. A system (e.g., a wearable computing device, a server, a mobile device, etc.) in accordance with techniques of this disclosure may offer this type of capability.

By using data obtained by a wearable computing device (e.g., a smart watch), a computing system and/or device can receive accurate information identifying whether a person is a driver or a passenger. The techniques may also provide a way, for example, for a system and/or device to learn and begin to understand historical driving patterns (e.g., how much of the time was the user a passenger and how much were they a driver). The techniques may also be used to eliminate and improve the prediction of activities (e.g. if we detect that the user is driving, then they are probably not on a bus). In some examples, low energy beacons (e.g., Bluetooth beacons) may be located at opposite sides of a transportation vehicle to internally localize the position of a person who wears a wearable computing device to determine whether that person is driving or a passenger.

Figure 3:
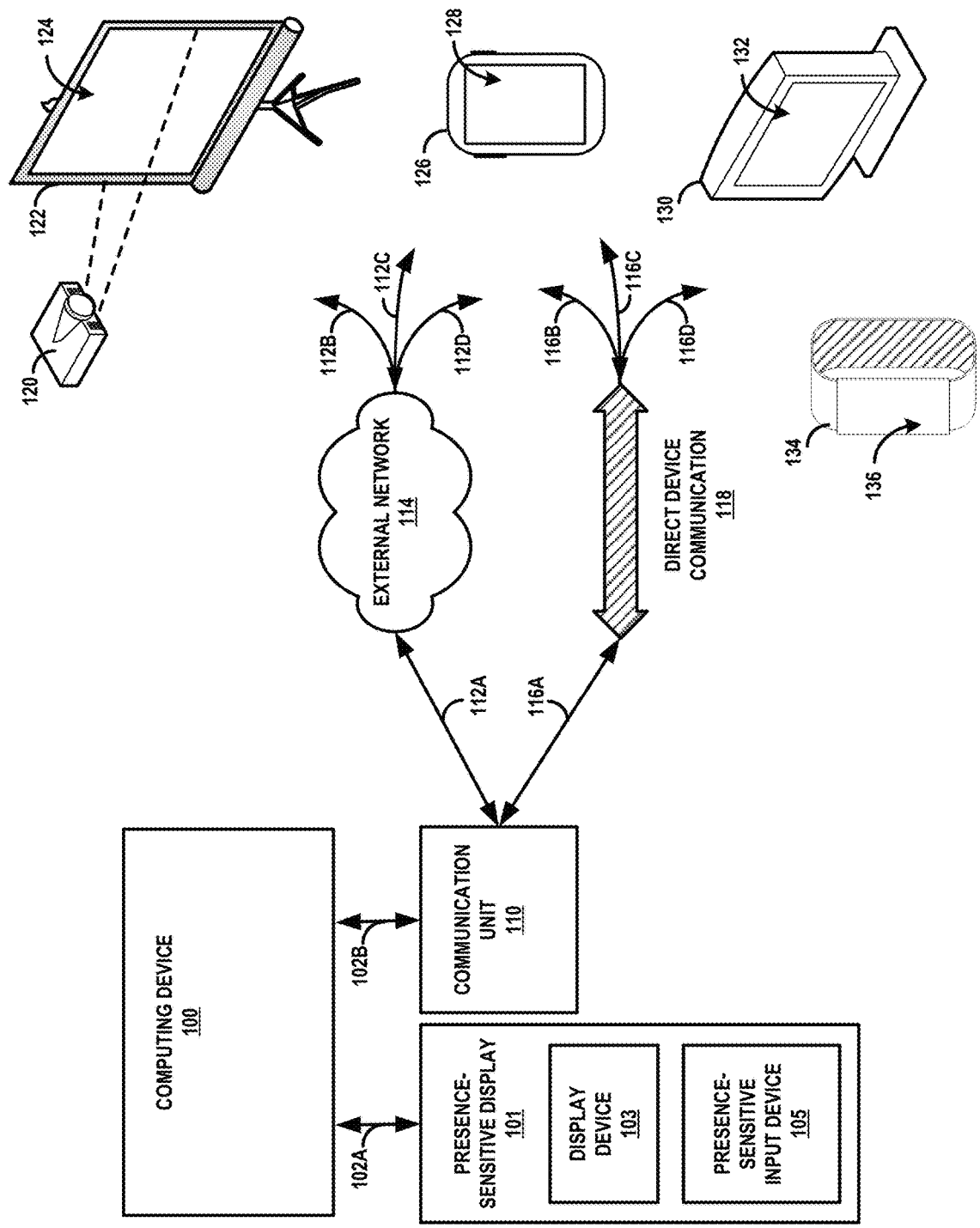
FIG. 3 is a block diagram illustrating an example computing device that outputs graphical content for display at a remote device, in accordance with one or more techniques of the present disclosure.

FIG. 3 is a block diagram illustrating an example computing device that outputs graphical content for display at a remote device, in accordance with one or more techniques of the present disclosure. Graphical content, generally, may include any visual information that may be output for display, such as text, images, a group of moving images, etc. The example shown in FIG. 3 includes computing device 100, presence-sensitive display 101, communication unit 110, projector 120, projector screen 122, mobile device 126, and visual display device 130. Although shown for purposes of example in FIGS. 1 and 2 as a stand-alone wearable computing device 10, a computing device such as computing devices 10 and 100 may, generally, be any component or system that includes a processor or other suitable computing environment for executing software instructions and, for example, need not include a presence-sensitive display.

As shown in the example of FIG. 3, computing device 100 may be a processor that includes functionality as described with respect to processor 40 in FIG. 2. In such examples, computing device 100 may be operatively coupled to presence-sensitive display 101 by a communication channel 102A, which may be a system bus or other suitable connection. Computing device 100 may also be operatively coupled to communication unit 110, further described below, by a communication channel 102B, which may also be a system bus or other suitable connection. Although shown separately as an example in FIG. 3, computing device 100 may be operatively coupled to presence-sensitive display 101 and communication unit 110 by any number of one or more communication channels.

In other examples, such as illustrated previously by wearable computing device 10 and computing device 8 in FIGS. 1-2, a computing device may refer to a portable or mobile device such as mobile phones (including smart phones), laptop computers, computing watches, computing eye glasses, wearable computing devices, etc. In some examples, a computing device may be a desktop computers, tablet computers, smart television platforms, cameras, personal digital assistants (PDAs), servers, mainframes, etc.

Presence-sensitive display 101 may include display device 103 and presence-sensitive input device 105. Display device 103 may, for example, receive data from computing device 100 and display the graphical content. In some examples, presence-sensitive input device 105 may determine one or more inputs (e.g., continuous gestures, multi-touch gestures, single-touch gestures, etc.) at presence-sensitive display 101 using capacitive, inductive, and/or optical recognition techniques and send indications of such input to computing device 100 using communication channel 102A. In some examples, presence-sensitive input device 105 may be physically positioned on top of display device 103 such that, when a user positions an input unit over a graphical element displayed by display device 103, the location at which presence-sensitive input device 105 corresponds to the location of display device 103 at which the graphical element is displayed. In other examples, presence-sensitive input device 105 may be positioned physically apart from display device 103, and locations of presence-sensitive input device 105 may correspond to locations of display device 103, such that input can be made at presence-sensitive input device 105 for interacting with graphical elements displayed at corresponding locations of display device 103.

As shown in FIG. 3, computing device 100 may also include and/or be operatively coupled with communication unit 110. Communication unit 110 may include functionality of communication unit 44 as described in FIG. 2. Examples of communication unit 110 may include a network interface card, an Ethernet card, an optical transceiver, a radio frequency transceiver, or any other type of device that can send and receive information. Other examples of such communication units may include Bluetooth, 3G, and Wi-Fi radios, Universal Serial Bus (USB) interfaces, etc. Computing device 100 may also include and/or be operatively coupled with one or more other devices, e.g., input devices, output devices, memory, storage devices, etc. that are not shown in FIG. 3 for purposes of brevity and illustration.

FIG. 3 also illustrates a projector 120 and projector screen 122. Other such examples of projection devices may include electronic whiteboards, holographic display devices, and any other suitable devices for displaying graphical content. Projector 120 and projector screen 122 may include one or more communication units that enable the respective devices to communicate with computing device 100. In some examples, the one or more communication units may enable communication between projector 120 and projector screen 122. Projector 120 may receive data from computing device 100 that includes graphical content. Projector 120, in response to receiving the data, may project the graphical content onto projector screen 122. In some examples, projector 120 may determine one or more inputs (e.g., continuous gestures, multi-touch gestures, single-touch gestures, etc.) at projector screen 122 using optical recognition or other suitable techniques and send indications of such input using one or more communication units to computing device 100. In such examples, projector screen 122 may be unnecessary, and projector 120 may project graphical content on any suitable medium and detect one or more user inputs using optical recognition or other such suitable techniques.

Projector screen 122, in some examples, may include a presence-sensitive display 124. Presence-sensitive display 124 may include a subset of functionality or all of the functionality of UI device 4 as described in this disclosure. In some examples, presence-sensitive display 124 may include additional functionality. Projector screen 122 (e.g., an electronic display of computing eye glasses), may receive data from computing device 100 and display the graphical content. In some examples, presence-sensitive display 124 may determine one or more inputs (e.g., continuous gestures, multi-touch gestures, single-touch gestures, etc.) at projector screen 122 using capacitive, inductive, and/or optical recognition techniques and send indications of such input using one or more communication units to computing device 100.

FIG. 3 also illustrates mobile device 126, visual display device 130, and wearable computing device 134. Devices 126, 130, and 134 may each include computing and connectivity capabilities. One example of mobile device 126 may be computing device 8 of FIG. 1. Other examples of mobile device 126 may include e-reader devices, convertible notebook devices, and hybrid slate devices. Examples of visual display devices 130 may include other semi-stationary devices such as televisions, computer monitors, etc. One example of wearable computing device 134 may be wearable computing device 10 of FIG. 1. Other examples of wearable computing device 134 include computerized watches, computerized eyeglasses, etc.

As shown in FIG. 3, mobile device 126 may include a presence-sensitive display 128. Visual display device 130 may include a presence-sensitive display 132. Wearable computing device 134 may include a presence-sensitive display 136. Presence-sensitive displays 128, 132, and 136 may include a subset of functionality or all of the functionality of UID 12 as described in this disclosure. In some examples, presence-sensitive displays 128, 132, and 136 may include additional functionality. In any case, presence-sensitive displays 128, 132, and 136, for example, may receive data from computing device 100 and display the graphical content. In some examples, presence-sensitive displays 128, 132, and 136 may determine one or more inputs (e.g., continuous gestures, multi-touch gestures, single-touch gestures, etc.) at projector screen using capacitive, inductive, and/or optical recognition techniques and send indications of such input using one or more communication units to computing device 100.

As described above, in some examples, computing device 100 may output graphical content for display at presence-sensitive display 101 that is coupled to computing device 100 by a system bus or other suitable communication channel. Computing device 100 may also output graphical content for display at one or more remote devices, such as projector 120, projector screen 122, mobile device 126, visual display device 130, and wearable computing device 134. For instance, computing device 100 may execute one or more instructions to generate and/or modify graphical content in accordance with techniques of the present disclosure. Computing device 100 may output the data that includes the graphical content to a communication unit of computing device 100, such as communication unit 110. Communication unit 110 may send the data to one or more of the remote devices, such as projector 120, projector screen 122, mobile device 126, visual display device 130, and/or wearable computing device 134. In this way, computing device 100 may output the graphical content for display at one or more of the remote devices. In some examples, one or more of the remote devices may output the graphical content at a presence-sensitive display that is included in and/or operatively coupled to the respective remote devices.

In some examples, computing device 100 may not output graphical content at presence-sensitive display 101 that is operatively coupled to computing device 100. In other examples, computing device 100 may output graphical content for display at both a presence-sensitive display 101 that is coupled to computing device 100 by communication channel 102A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 100 and output for display at presence-sensitive display 101 may be different than graphical content display output for display at one or more remote devices.

Computing device 100 may send and receive data using any suitable communication techniques. For example, computing device 100 may be operatively coupled to external network 114 using network link 112A. Each of the remote devices illustrated in FIG. 3 may be operatively coupled to network external network 114 by one of respective network links 112B, 112C, and 112D. External network 114 may include network hubs, network switches, network routers, etc., that are operatively inter-coupled thereby providing for the exchange of information between computing device 100 and the remote devices illustrated in FIG. 3. In some examples, network links 112A-112D may be Ethernet, ATM or other network connections. Such connections may be wireless and/or wired connections.

In some examples, computing device 100 may be operatively coupled to one or more of the remote devices included in FIG. 3 using direct device communication 118. Direct device communication 118 may include communications through which computing device 100 sends and receives data directly with a remote device, using wired or wireless communication. That is, in some examples of direct device communication 118, data sent by computing device 100 may not be forwarded by one or more additional devices before being received at the remote device, and vice-versa. Examples of direct device communication 118 may include Bluetooth, Near-Field Communication, Universal Serial Bus, Wi-Fi, infrared, etc. One or more of the remote devices illustrated in FIG. 3 may be operatively coupled with computing device 100 by communication links 116A-116D. In some examples, communication links 112A-112D may be connections using Bluetooth, Near-Field Communication, Universal Serial Bus, infrared, etc. Such connections may be wireless and/or wired connections.

Computing device 100 may be operatively coupled to visual display device 130 using external network 114. Computing device 100 may determine, based on one or more indications of movement and at least one indication that wearable computing device 134 is in the presence of transportation vehicle 2, a probability that a person wearing wearable computing device 134 is performing an act of driving. For example, a driving probability module of computing device 100 may obtain information from wearable computing device 134 that includes one or more indications (e.g., data) of movement associated with wearable computing device 134. The movement data may indicate an acceleration, an orientation, and/or an elevation of wearable computing device 134. The driving probability module of computing device 100 may also receive information from wearable computing device 134 indicating that wearable computing device 134 is communicating via Bluetooth with transportation vehicle 2. Computing device 100 may infer that wearable computing device 134 is in the presence of transportation vehicle 2 when wearable computing device 134 is communicating via Bluetooth with transportation vehicle 2

The driving probability module of computing device 100 may compare the indications of movement associated with wearable computing device 134 to one or more patterns of movement associated with driving actions (e.g., turning a steering wheel, depressing a pedal, moving a gear shift, and the like). For example, computing device 100 may compare the movement data to indications of movement associated with turning a steering wheel of transportation vehicle 2, moving a gear shift of transportation vehicle 2, etc. Computing device 100 may compute an overall probability that the person wearing wearable computing device 134 is performing an act of driving if the patterns associated with any one of the driving acts match (e.g., have a correlation value greater than 0.5 or 50%) the pattern of movement associated with the movement data.

Computing device 100 may compare the probability that the person wearing wearable computing device 134 is performing an act of driving to a probability threshold for determining whether the person is driving. Computing device 100 may determine that the probability satisfies the probability threshold and, in response, output information to wearable computing device 134 to configure device 134 to perform an operation, an action, and/or otherwise provide a function related to driving. For example, computing device 100 may output graphical information for transmission to device 134 in addition to providing instructions for causing wearable computing device 134 device to present a graphical user interface at presence-sensitive screen 136 based on the graphical information. Computing device 100 may send the graphical information to wearable computing device 134 via communication unit 110 and external network 114. Presence-sensitive screen 128 may receive the information and present a graphical indication that computing device 100 predicts the person wearing wearable computing device 134 is driving.

Figure 4:
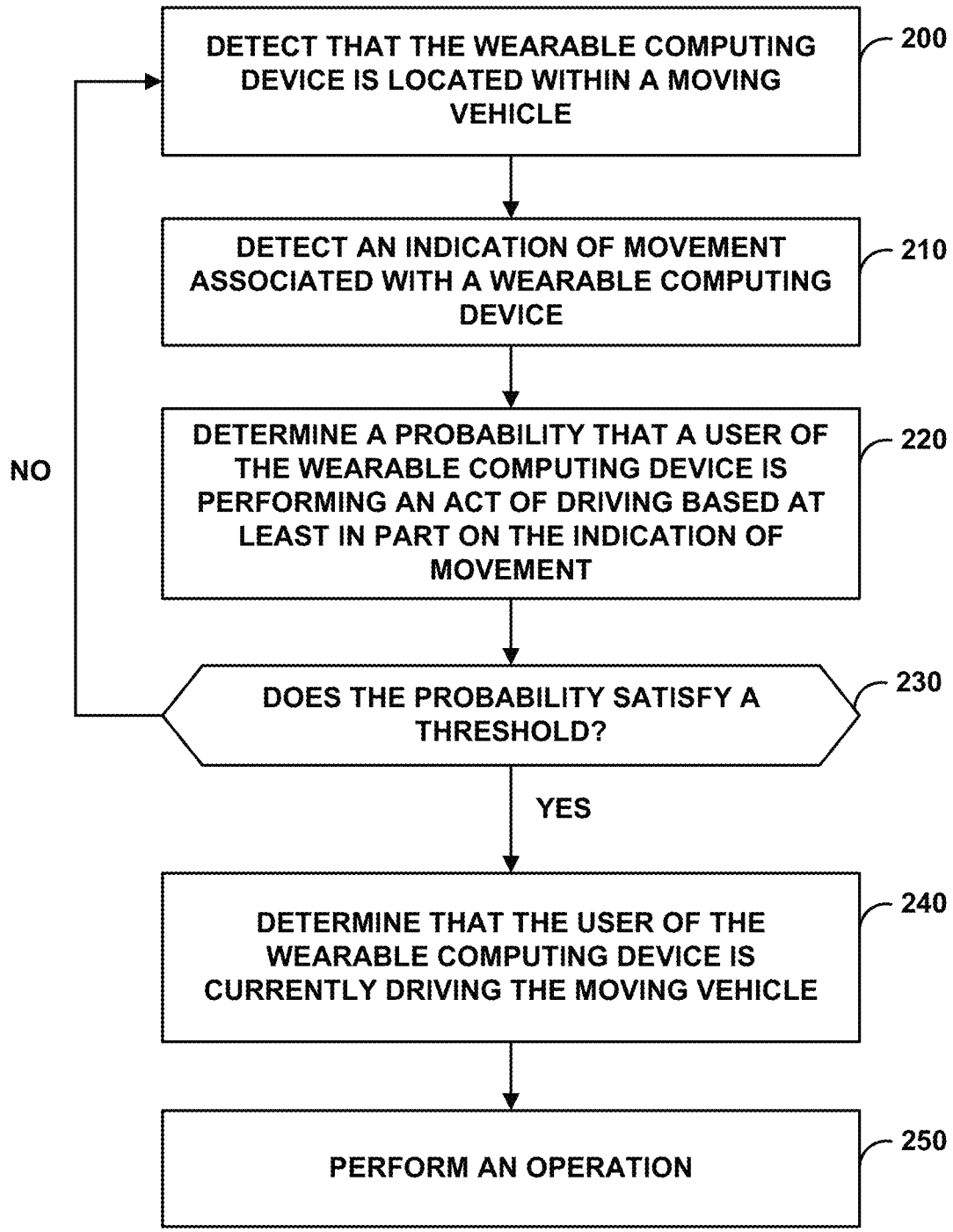
FIG. 4 is a flowchart illustrating example operations of an example wearable computing device configured to determine whether a user of the wearable computing device is driving a moving vehicle, in accordance with one or more aspects of the present disclosure.

FIG. 4 is a flowchart illustrating example operations of an example wearable computing device configured to determine whether a person wearing the wearable computing device is driving a transportation vehicle, in accordance with one or more aspects of the present disclosure. The process shown in FIG. 4 may be performed by one or more processors of a computing device, such as wearable computing devices 10 and 100 illustrated in FIG. 1, FIG. 2, and FIG. 3. For purposes of illustration, FIG. 4 is described below within the context of computing system 1 of FIG. 1.

Wearable computing device 10 may detect that the wearable computing device is located within a moving vehicle (200). For example, location module 22 may correlate signal data having an identifier of transportation vehicle 2 indicates that wearable computing device 10 is in the presence of transportation vehicle 2.

After wearable computing device 10 detects the presence of the transportation vehicle, wearable computing device 10 may detect an indication of movement associated with wearable computing device 10 (210). For instance, driver module 24 of wearable computing device 10 may receive signal data obtained by an accelerometer, a gyroscope, a barometer, or other sensor of wearable computing device 10 and based on that signal data, driver module 24 may define one or more indications of movement associated with wearable computing device 10. The one or more indications of movement may indicate a direction, a speed, an orientation, etc. of wearable computing device 10.

Wearable computing device 10 may determine, based at least in part on the indication of movement, a probability that a user of the wearable computing device 10 is performing an act of driving (220). For example, wearable computing device 10 may output, data or other forms of information that define the one or more indications of movement associated with wearable computing device 10 to mobile computing device 8 and/or remote computing system 6. Driving probability module 30 of remote computing system 6 or a similar driving probability module of mobile computing device 8, may analyze the information received from wearable computing device 10 to determine whether the information matches sensor data associated with one or more predefined and/or learned driving patterns. Remote computing system 6 and/or mobile computing device 8 may computer one or more probabilities that the person wearing wearable computing device 10 is performing an act of driving. Wearable computing device 10 may then receive back, from mobile computing device 8 and/or remote computing system 6, information containing the one or more probabilities that the person wearing wearable computing device 10 is performing an act of driving.

Said differently, wearable computing device 10 may output, for transmission to at least one second computing device, information comprising the one or more indications of movement. Responsive to outputting the information comprising the one or more indications of movement, wearable computing device 10 may receive, from the at least one second computing device, the probability that the person wearing wearable computing device 10 is performing the act of driving.

In some examples, wearable computing device 10 may determine a relative elevation between wearable computing device 10 and at least one second computing device associated with the person wearing the wearable computing device, and determine, based at least in part on the relative elevation, the probability that the person wearing wearable computing device 10 is performing the act of driving. For example, the person wearing wearable computing device 10 may also rely on mobile computing device 8, for instance, to make phone calls. If the person is driving while wearing wearable computing device 10, for example, on his or her wrist, he or she may place his or her phone (e.g., mobile computing device 8) in a console of transportation vehicle 2 or in his or her pocket. In any event, the elevation of mobile computing device 8 while either in the console or in the pocket may remain fixed, relative to the interior of the passenger compartment of transportation vehicle 2. In contrast, the elevation of wearable computing device 10 may change relative to the interior of the passenger compartment of transportation vehicle 2 (e.g., as the person moves the arm at which wearable computing device 10 is attached as the person performs various acts of driving). Wearable computing device 10 may identify changes in the difference between the elevation of mobile computing device 8 and wearable computing device 10 to determine when the person is driving.

For example, driver module 24 of wearable computing device 10 may receive sensor information from mobile computing device 8 that contains barometric pressure information associated with mobile computing device 8. In addition, driver module 24 may obtain barometric pressure information from one or more sensor devices 14 of wearable computing device 10. Driver module 24 of wearable computing device 10 may determine, based on a barometric pressure associated with each of wearable computing device 10 and mobile computing device 8 (e.g., at least one second computing device), the relative elevation between wearable computing device 10 and mobile computing device 8 associated with the person wearing the wearable computing device. Wearable computing device 10 may compare the relative elevation over time to one or more patterns stored at driving patterns data store 28 and/or rely on a machine learning system of driving probability module 26 to determine, based at least in part on the relative elevation, the probability that the person wearing wearable computing device 10 is performing the act of driving.

In some examples, wearable computing device 10 may determine a relative acceleration, degree of tilt, or orientation between wearable computing device 10 and at least one second computing device associated with the person wearing the wearable computing device, and determine, based at least in part on the relative acceleration, degree of tilt, or orientation, the probability that the person wearing wearable computing device 10 is performing the act of driving. For example, the person wearing wearable computing device 10 may also rely on mobile computing device 8, for instance, to make phone calls. If the person is driving while wearing wearable computing device 10, for example, on his or her wrist, he or she may place his or her phone (e.g., mobile computing device 8) in a console of transportation vehicle 2 or in his or her pocket. In any event, the acceleration of mobile computing device 8 while either in the console or in the pocket may remain fixed, relative to the interior of the passenger compartment of transportation vehicle 2. In contrast, the acceleration of wearable computing device 10 may change relative to the interior of the passenger compartment of transportation vehicle 2 (e.g., as the person moves the arm at which wearable computing device 10 is attached as the person performs various acts of driving). Wearable computing device 10 may identify changes in the difference between the acceleration of mobile computing device 8 and wearable computing device 10 to determine when the person is driving.

For example, driver module 24 of wearable computing device 10 may receive sensor information from mobile computing device 8 that contains accelerometer data, a degree of tilt from a tilt sensor of mobile computing device 8, or a degree of orientation from a gyroscope of mobile computing device 8. In addition, driver module 24 may obtain an acceleration, a degree of tilt, or a degree of orientation from one or more sensor devices 14 of wearable computing device 10. Driver module 24 of wearable computing device 10 may determine, based on an acceleration, a degree of tilt, or a degree of orientation associated with each of wearable computing device 10 and mobile computing device 8 (e.g., at least one second computing device), the relative acceleration, degree of tilt, or orientation between wearable computing device 10 and mobile computing device 8 associated with the person wearing the wearable computing device. Wearable computing device 10 may compare the relative acceleration, degree of tilt, or orientation over time to one or more patterns stored at driving patterns data store 28 and/or rely on a machine learning system of driving probability module 26 to determine, based at least in part on the relative acceleration, degree of tilt, or orientation, the probability that the person wearing wearable computing device 10 is performing the act of driving.

Responsive to determining that the probability satisfies a probability threshold (230), wearable computing device 10 may determine that the user of the wearable computing device 10 is currently driving the moving vehicle (240). For instance, driver module 24 of wearable computing device 10 may compare the probability to a fifty percent threshold and if the probability is greater than fifty percent, determine that the person is likely driving transportation vehicle 2.

Wearable computing device 10 may perform, based on the determination that the person wearing wearable computing device 10 is currently driving the transportation vehicle, an operation (250). For example, driver module 24 may output information to applications 34 to cause one or more of applications 34 to cease functioning and/or provide additional functionality to the person while he or she is driving.

A system and/or device (e.g., a wearable computing device, a server, a mobile device, etc.) in accordance with the techniques of this disclosure may determine that a person who is wearing a wearable computing device is driving and not a passenger in one of various ways. For instance, one way for a system and/or device to determine that a person wearing a device is driving may be for the system and/or device to rely on sensors (e.g., accelerometers, gyroscopes, etc.) for receiving data that indicates a turning motion. Turning motions may be used to indicate: adjustments to a steering wheel (e.g., large turning motions while parking, small turning motions to maintain an automobile's position in a lane, etc.) done by a user. Vertical positions may be used to indicate where a person's hand is held relative to the controls of a transportation vehicle. For instance, if the same vertical position of a user's hand is maintained, the person may not be driving. However if the system and/or device detects a change in vertical position (e.g., raising and lowering the hand periodically), the system and/or device may infer that the person is taking his or her hand off the steering wheel to grab a gear shifter to change gears of the automobile. Patterns of movement (e.g., a repeated motion of shifting gears and then returning to the steering position) may be used by system and/or device to detect driving.

One other way for a system and/or device to determine that a person wearing a device is driving may be for the system and/or device to rely on comparative measurements of a person's handheld device (e.g., a mobile phone, a tablet, etc.) and the wearable computing device. For example, a system and/or device may determine a comparative barometric pressure between a wearable computing device and a mobile phone to determine relative elevation and changes of elevation. In some examples, the system and/or device may use accelerometer data detected by a wearable computing device and a mobile phone to "subtract out" and/or "filter" vibrations and other system noise attributed to the transportation vehicle to isolate the signals and motions detected by the wearable computing device.

One other way for a system and/or device to determine that a person wearing a device is driving may be for the system and/or device to rely on information from multiple devices that are all in the presence of a transportation vehicle. For instance, the system and/or device may sense when there are more than one person wearing computerized watches in a vehicle. If two people wear watches in a vehicle, only one person may be a driver. The system and/or device may compute a probability that each is driving and determine that the person with the higher degree of likelihood of being the driver is driving and the other person is merely a passenger riding in the vehicle.

Figure 5:
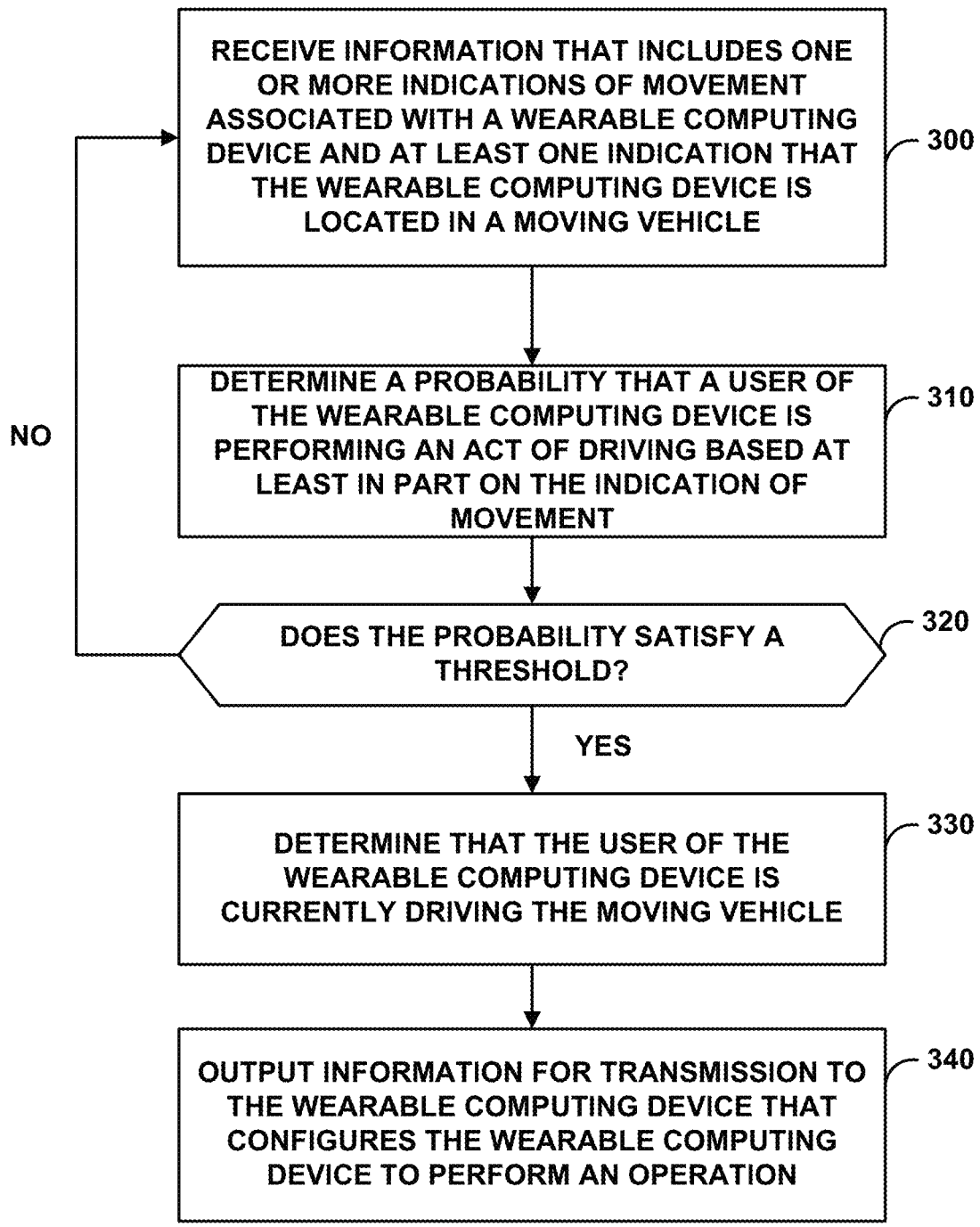
FIG. 5 is a flowchart illustrating example operations of an example computing system configured to determine whether a user of a wearable computing device is driving a moving vehicle, in accordance with one or more aspects of the present disclosure.

FIG. 5 is a flowchart illustrating example operations of an example computing system configured to determine whether a person wearing a wearable computing device is driving a transportation vehicle, in accordance with one or more aspects of the present disclosure. The process shown in FIG. 5 may be performed by one or more processors of a computing system, such as remote computing system 6 illustrated in FIG. 1. For purposes of illustration, FIG. 5 is described below within the context of system 1 of FIG. 1.

Remote computing system 6 may receive, from wearable computing device 10, information that includes one or more indications of movement associated with wearable computing device 10 and at least one indication that wearable computing device 10 is located within a moving vehicle (300). For example, driver probability module 30 may receive a request from driver module 24 of wearable computing device 10 for a probability indicating whether or not the person wearing wearable computing device 10 is driving transportation vehicle 2. The request from driver module 24 may include raw sensor data obtained by one or more sensor devices 14 and/or one or more defined indications of movement based on that sensor data. In addition, the request may include information indicating that wearable computing device 10 is in the presence of transportation vehicle 2 and may further indicate the type, location, speed, and/or elevation of transportation vehicle 2.

Driving probability module 30 may process the request from driver module 24 and analyze the information indicating movement and the presence obtained with the request. Remote computing system 6 may determine, based at least in part on the one or more indications of movement and the at least one indication that wearable computing device 10 is within the presence of transportation vehicle 2, a probability that a user of the wearable computing device is performing an act of driving (310). For instance, driving probability module 30 may feed the indications of movement as input to one or more rules of a machine learning system for determining whether the indications of movement match or correlate movements contained in other information that the machine learning system identifies when other persons wearing wearable computing devices are driving.

In some examples, driving probability module 30 may identify one or more changes to a measurement of acceleration or orientation of wearable computing device 10. For instance, driving probability module 30 may identify a portion of the data containing the indications of movement having an increase and/or a decrease to the acceleration of wearable computing device 10 and/or a change to the orientation of wearable computing device 10.

Driving probability module 30 may determine, based on the one or more changes to the measurement of acceleration or orientation, a probability that the person wearing the wearable computing device is turning a steering wheel or shifting a gear shift of the transportation vehicle. For instance, the machine learning system of driving probability module 30 may compute a respective probability associated with each one of multiple acts of driving (e.g., steering, shifting, etc.). Driving probability module 30 may determine, based at least in part on each respective probability associated with each one of the multiple acts of driving, the probability that the person wearing wearable computing device 10 is performing the act of driving. For instance, driving probability module 30 may compute a weighted average of the probabilities associated with the various acts of driving to compute a single probability indicative of whether the person is driving or not.

In some examples, driving probability module 30 may rely on the probability of one act of driving to determine the probability of a different act of driving. For instance, driving probability module 30 may compute the probability that the person is changing lanes with transportation vehicle 2 based on a probability that the person is steering or turning the steering wheel of transportation vehicle 2, in addition to other information (e.g., speed, acceleration, direction, etc.) of wearable computing device 10.

In some examples, driving probability module 30 of remote computing system 6 may identify, based on the one or more indications of movement received from wearable computing device 10, a pattern of movement associated with the act of driving. Responsive to identifying the pattern of movement, driving probability module 30 may determine the probability that the person wearing wearable computing device 10 is performing the act of driving. For example, as described above, driving probability module 30 may compare the indications of movement obtained from wearable computing device 10 to data stored at driving patterns data store 32 to determine whether the received indications of movement have a strong enough correlation (e.g., greater than 0) for indicating that the person is driving. In some examples, the patterns of movement identified by driving probability module 30 may include one or more sequences of movements such as shifting a gear shift of transportation vehicle 2, raising a hand of the person, turning a steering wheel of transportation vehicle 2, and lowering the hand of the person, and a combination of raising and lowering the hand of the person, turning the steering wheel, and shifting the gear shift of the transportation vehicle.

Remote computing system 6 may determine whether the probability satisfies a probability threshold (320). For example, driving probability module 30 may compare the probability computed above to one or more threshold probabilities used for determining whether the person is driving. A probability threshold may be fifty percent, ninety percent, or other percentage.

Responsive to determining that the probability satisfies a probability threshold, remote computing system 6 may determine that the user of the wearable computing device 10 is currently driving the moving vehicle (330). For instance if driving probability module 30 determines that the probability that the person is turning a steering wheel of transportation vehicle 2 is greater than fifty percent and/or that the probability that the person is moving a gear shift of transportation vehicle 2 is greater than thirty percent, that the person is then likely to be driving transportation vehicle 2.

Remote computing system 6 may output, for transmission to wearable computing device 10, information that configures wearable computing device 10 to perform an operation (340). For example, driving probability module 30 may respond to the request from driver module 24 by providing information, data, and/or other indications that the person is determined to be driving to cause wearable computing device 10 to perform an operation.

In some examples, remote computing system 6 may rely on information about other passengers of transportation vehicle 2 to determine the probability that the person wearing wearable computing device 10 is driving and causing wearable computing device 10 to perform certain operations when the person is driving. For example, driving probability module 30 may receive information from wearable computing device 10 and/or mobile computing device 8 and determine a probability that at least one person not wearing wearable computing device 10 and in transportation vehicle 2 is performing the act of driving. Said differently, a person other than the person wearing wearable computing device 10 may be holding, operating, or otherwise be associated with mobile computing device 8 or may even be wearing a different wearable computing device. Driving probability module 30 may receive sensor information obtained from the mobile and/or wearable device associated with the other person to determine whether that other person is driving transportation vehicle 2.

Driving probability module 30 may compare the probability that each of the other persons in transportation vehicle 2 is driving to the probability that the person wearing wearable computing device 10 is driving. Responsive to determining that the probability that the person wearing wearable computing device 10 is driving exceeds the probability that any of the other persons not wearing wearable computing device 10 is driving, driving probability module 30 may determine that the person wearing wearable computing device 10 and not the at least one person not wearing wearable computing device 10 is currently driving transportation vehicle 2. After determining that the person wearing wearable computing device 10 and not the other persons is driving, driving probability module 26 of remote computing system 6 may output, for transmission to wearable computing device 10, the information that configures wearable computing device 10 to perform the operation.

Clause 1. A method comprising: detecting that a wearable computing device is located within a moving vehicle; detecting, by the wearable computing device, an indication of movement associated with the wearable computing device; determining, based at least in part on the indication of movement, that a user of the wearable computing device is currently driving the moving vehicle; and performing, based on the determination that the user of the wearable computing device is currently driving the moving vehicle, an operation.

Clause 2. The method of clause 1, wherein determining that the user of the wearable computing device is currently driving the moving vehicle comprises: determining a probability that the user of the wearable computing device is performing an act of driving; and responsive to determining that the probability satisfies a probability threshold, determining that the user is currently driving the moving vehicle.

Clause 3. The method of clause 2, wherein determining the probability that the user of the wearable computing device is performing the act of driving comprises: outputting, by the wearable computing device, for transmission to at least one second computing device, information comprising the indication of movement; and responsive to outputting the information comprising the indication of movement, receiving, by the wearable computing device, from the at least one second computing device, the probability that the user of the wearable computing device is performing the act of driving.

Clause 4. The method of any of clauses 2-3, wherein the act of driving comprises at least one of turning a steering wheel, depressing the steering wheel, shifting a gear shift, pressing a pedal, depressing the pedal, or raising and lowering a hand.

Clause 5. The method of any of clauses 1-4, wherein performing the operation comprises restricting access to at least some functionality of an application or operating system being executed by at least one of the wearable computing device or a second computing device.

Clause 6. The method of any of clauses 1-5, wherein performing the operation comprises outputting, by the wearable computing device, for transmission to at least one second computing device, information usable by the at least one second computing device to learn driving habits of the user of the wearable computing device.

Clause 7. The method of any of clauses 1-6, wherein performing the operation comprises outputting, by the wearable computing device, for transmission to at least one second computing device, information usable by the at least one second computing device to determine a driving route associated with the user of the wearable computing device.

Clause 8. The method of any of clauses 1-7, wherein performing the operation comprises deactivating, by the wearable computing device, a display device that is operatively coupled to at least one of the wearable computing device or a second computing device.

Clause 9. The method of any of clauses 1-8, wherein detecting the indication of movement associated with the wearable computing device comprises: determining, by the wearable computing device and based at least in part on a sensor of the wearable computing device, sensor information indicating at least one of an acceleration of the wearable computing device, an orientation of the wearable computing device, or a barometric pressure of the wearable computing device; and defining, based on the sensor information, the indication of movement.

Clause 10. The method of any of clauses 1-9, wherein detecting the indication of movement associated with the wearable computing device comprises: detecting an indication of movement associated with the moving vehicle; and subtracting the indication of movement associated with the moving vehicle from the indication of movement associated with the wearable computing device.

Clause 11. A wearable computing device comprising: at least one processor; at least one module operable by the at least one processor to: detect that the wearable computing device is located within a moving vehicle; detect an indication of movement associated with the wearable computing device; determine, based at least in part on the indication of movement, that a user of the wearable computing device is currently driving the moving vehicle; and perform, based on the determination that the user of the wearable computing device is currently driving the moving vehicle, an operation.

Clause 12. The wearable computing device of clause 11, wherein the at least one module is further operable by the at least one processor to determine that the user is currently driving the moving vehicle by at least: determining a probability that the user of the wearable computing device is performing an act of driving; and responsive to determining that the probability satisfies a probability threshold, determining that the user of the wearable computing device is currently driving the moving vehicle.

Clause 13. The wearable computing device of clause 12, wherein the at least one module is further operable by the at least one processor to determine the user of the wearable computing device is performing the act of driving by at least: outputting, by the wearable computing device, for transmission to at least one second computing device, information comprising the one or more indications of movement; and responsive to outputting the information comprising the one or more indications of movement, receiving, by the computing system, from the at least one second computing device, the probability that the user of the wearable computing device is performing the act of driving.

Clause 14. The wearable computing device of any of clauses 11-13, wherein the at least one module is further operable by the at least one processor to: determine at least one of a relative elevation, acceleration, degree of tilt, or orientation between the wearable computing device and at least one second computing device associated with the user of the wearable computing device; and determine, based at least in part on the at least one of the relative elevation, acceleration, degree of tilt, or orientation, that the user of the wearable computing device is currently driving the moving vehicle.

Clause 15. The wearable computing device of clause 14, wherein the at least one module is further operable by the at least one processor to determine the at least one of the relative elevation, acceleration, degree of tilt, or orientation between the wearable computing device and the at least one second computing device associated with the user of the wearable computing device by at least determining, based on at least one of a barometric pressure, an acceleration, a degree of tilt, or a degree of orientation associated with each of the wearable computing device and the at least one second computing device, the at least one of the relative elevation, acceleration, degree of tilt, or orientation between the wearable computing device and the at least one second computing device associated with the user of the wearable computing device.

Clause 16. A method comprising: receiving, by a computing system, from a wearable computing device, information that includes one or more indications of movement associated with the wearable computing device and at least one indication that the wearable computing device is located within a moving vehicle; determining, by the computing system, based at least in part on the one or more indications of movement and the at least one indication that the wearable computing device is located within the moving vehicle, a probability that a user of the wearable computing device is performing an act of driving; responsive to determining that the probability satisfies a probability threshold, determining, by the computing system, that the user of the wearable computing device is currently driving the moving vehicle; and outputting, by the computing system, for transmission to at least one of the wearable computing device or at least one second computing device, information that configures the at least one of the wearable computing device or the at least one second device to perform an operation.

Clause 17. The method of clause 16, wherein the probability is a first probability, the method further comprising: determining, by the computing system, a second probability that at least one person not wearing the wearable computing device and located in the moving vehicle is performing the act of driving; responsive to determining that the first probability exceeds the second probability, determining, by the computing system, that the user of the wearable computing device and not the at least one person not wearing the wearable computing device is currently driving the moving vehicle; and outputting, by the computing system, for transmission to the at least one of the wearable computing device or the at least one second computing device, the information that configures the at least one of the wearable computing device or the at least one second computing device to perform the operation.

Clause 18. The method of any of clauses 16-17, wherein the probability is a first probability, the method further comprising: identifying, by the computing system, one or more changes to a measurement of acceleration or orientation of the wearable computing device; determining, by the computing system, based on the one or more changes to the measurement of acceleration or orientation, a second probability that the user of the wearable computing device is turning a steering wheel or shifting a gear shift of the moving vehicle; and determining, by the computing system, based at least in part on the second probability, the first probability that the user of the wearable computing device is performing the act of driving.

Clause 19. The method of any of clauses 16-18, wherein determining the probability that the user of the wearable computing device is performing the act of driving comprises: identifying, by the computing system, based on the one or more indications of movement, a pattern of movement associated with the act of driving; and responsive to identifying the pattern of movement, determining, by the computing system, the probability that the user of the wearable computing device is performing the act of driving.

Clause 20. The method of clause 19, wherein the pattern of movement comprises a sequence of movements comprising at least one of shifting a gear shift, raising a hand, turning a steering wheel, lowering the hand, or a combination of raising and lowering the hand, turning the steering wheel, and shifting the gear shift.

Clause 21. A computer readable storage medium comprising instructions, that when executed, configure one or more processors of a computing device to perform any of the methods of clauses 1-10.

Clause 22. A computer readable storage medium comprising instructions, that when executed, configure one or more processors of a computing system to perform any of the methods of clauses 16-20.

Clause 23. A computing device comprising means for performing any of the methods of clauses 1-10.

Clause 24. A computing system comprising means for performing any of the methods of clauses 16-20.

Clause 24. A computing system comprising means for performing any of the methods of clauses 1-10 and 16-20.

In each of the various examples described above, computing devices, mobile computing devices, wearable computing devices, computing systems, and other computing devices may analyze information (e.g., locations, speeds, etc.) associated with the wearable computing devices, computing systems, and other computing devices, only if the wearable computing devices, computing systems, and other computing devices, receive permission from a user of such wearable computing devices, computing systems, and other computing devices, to analyze the information. For example, in situations discussed below in which a wearable computing device or computing system may collect or may make use of information associated with a user and the wearable computing device and computing system, the user may be provided with an opportunity to control whether programs or features of the wearable computing device and computing system can collect and make use of user information (e.g., information about a user's location, speed, mode of transportation, e-mail, a user's social network, social actions or activities, profession, a user's preferences, or a user's past and current location), or to control whether and/or how to the wearable computing device and computing system receive content that may be relevant to the user. In addition, certain data may be treated in one or more ways before it is stored or used by the wearable computing device and computing system, so that personally identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the wearable computing device and computing system.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
receiving an indication of movement associated with a wearable computing device that is located in a vehicle;
determining a degree of likelihood that a user of the wearable computing device is driving the vehicle;

responsive to determining that the degree of likelihood satisfies a threshold, determining that the user of the wearable computing device is currently driving the vehicle; and responsive to determining that the user of the wearable computing device is currently driving the vehicle, performing, by a different computing device that is located in the vehicle and is associated with the user of the wearable computing device, one or more operations that prevent the user from accessing at least one feature of the different computing device while the user of the wearable computing device is currently driving the vehicle.

2. The method of claim 1, wherein the indication of the movement comprises sensor data indicating a turning motion detected by a sensor of the wearable computing device or the different device.

3. The method of claim 1, wherein the operation includes at least one of:
   disabling at least one input component of the different computing device; or
   disabling at least one output component of the different computing device.

4. The method of claim 3, wherein the input component includes a presence-sensitive input component of the different computing device.

5. The method of claim 3, wherein the output component includes a display of the different computing device.

6. The method of claim 1, wherein the operation includes disabling text messaging functions of the wearable computing device or the different computing device.

7. The method of claim 1, wherein performing the one or more operations further comprises restricting access to at least some functionality of the wearable computing device while the user of the wearable computing device is currently driving the vehicle.

8. The method of claim 1, wherein determining the degree of likelihood that the user of the wearable computing device is driving comprises determining, from inputting the indication of the movement into a machine learning system, the degree of likelihood that the user of the wearable computing device is driving.

9. The method of claim 1, wherein determining the degree of likelihood that the user of the wearable computing device is currently driving the vehicle is in response to determining that a pattern identified from the movement associated with the wearable computing device is consistent with a pattern of movement associated with driving the vehicle.

10. The method of claim 1, further comprising:
    responsive to determining that the user of the wearable computing device is no longer driving the vehicle, enabling, by the different computing device, user access to the at least one feature of the different computing device.

11. A computing system comprising at least one processor configured to:
    receive an indication of movement associated with a wearable computing device that is located in a vehicle, wherein the computing system is located in the vehicle and is associated with the user of the wearable computing device;
    determine a degree of likelihood that a user of the wearable computing device is driving the vehicle;
    responsive to determining that the degree of likelihood satisfies a threshold, determine that the user of the wearable computing device is currently driving the vehicle; and
    responsive to determining that the user of the wearable computing device is currently driving the vehicle, perform one or more operations that prevent the user from accessing at least one feature of the computing system while the user of the wearable computing device is currently driving the vehicle.

12. The computing system of claim 11, wherein the indication of the movement comprises sensor data indicating a turning motion detected by a sensor of the wearable computing device or the computing system.

13. The computing system of claim 11, wherein the at least one processor is configured to determine the degree of likelihood that the user of the wearable computing device based at least in part by inputting the indication of the movement into a machine learning system.

14. The computing system of claim 11, wherein the at least one processor is configured to responsive to determining that the user of the wearable computing device is no longer driving the vehicle, enable user access to the at least one feature of the computing system.

15. The computing system of claim 11, wherein the at least one processor is configured to perform the one or more operations by restricting access to at least some functionality of the wearable computing device while the user of the wearable computing device is currently driving the vehicle.

16. A computer-readable storage medium comprising instructions that, when executed, cause at least one processor of a computing system to:
    receive an indication of movement associated with a wearable computing device that is located in a vehicle, wherein the computing system is located in the vehicle and is associated with the user of the wearable computing device;
    determine a degree of likelihood that a user of the wearable computing device is driving the vehicle;
    responsive to determining that the degree of likelihood satisfies a threshold, determine that the user of the wearable computing device is currently driving the vehicle; and
    responsive to determining that the user of the wearable computing device is currently driving the vehicle, perform one or more operations that prevent the user from accessing at least one feature of the computing system while the user of the wearable computing device is currently driving the vehicle.

17. The computer-readable storage medium of claim 16, wherein the indication of the movement comprises sensor data indicating a turning motion detected by a sensor of the wearable computing device or the computing system.

18. The computer-readable storage medium of claim 16, wherein the instructions, when executed, further cause the at least one processor to determine the degree of likelihood that the user of the wearable computing device based at least in part by inputting the indication of the movement into a machine learning system.

19. The computer-readable storage medium of claim 16, wherein the instructions, when executed, further cause the at least one processor to responsive to determining that the user of the wearable computing device is no longer driving the vehicle, enable user access to the at least one feature of the computing system.

20. The computer-readable storage medium of claim 16, wherein the instructions, when executed, further cause the at least one processor to perform the one or more operations by restricting access to at least some functionality of the wearable computing device while the user of the wearable computing device is currently driving the vehicle.

\* \* \* \* \*